US010601604B2

(12) United States Patent
Kozura et al.

(10) Patent No.: US 10,601,604 B2
(45) Date of Patent: Mar. 24, 2020

(54) DATA PROCESSING SYSTEMS AND METHODS FOR SMART HUB DEVICES

(71) Applicant: GOOGLE LLC, Mountain View, CA (US)

(72) Inventors: John Kozura, Boulder, CO (US); Haley A. Taylor, Boulder, CO (US); Jeff Mathews, Boulder, CO (US); Edward Hill, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 3 days.

(21) Appl. No.: 14/938,806

(22) Filed: Nov. 11, 2015

(65) Prior Publication Data

US 2016/0132031 A1    May 12, 2016

Related U.S. Application Data

(60) Provisional application No. 62/078,912, filed on Nov. 12, 2014.

(51) Int. Cl.
*G05B 15/02* (2006.01)
*H04L 12/28* (2006.01)

(52) U.S. Cl.
CPC ...... *H04L 12/2816* (2013.01); *H04L 12/2832* (2013.01)

(58) Field of Classification Search
CPC .................. H04L 12/2816; H04L 12/2832
See application file for complete search history.

(56) References Cited

U.S. PATENT DOCUMENTS 4,049,973 A * 9/1977 Lambert ................ G04C 23/16
236/47
4,393,342 A * 7/1983 Matsuoka ............ H02H 7/0851
318/266

(Continued)

OTHER PUBLICATIONS

Detailed Technical Specification of Security for Heterogeneous Access, May 31, 2002, 161 pgs, www.isrc.rhul.ac.uk/shaman/docs/d09v1.pdf.

(Continued)

*Primary Examiner* — Kenneth M Lo
*Assistant Examiner* — Mohammad A Rahman
(74) *Attorney, Agent, or Firm* — Morgan, Lewis & Bockius LLP

(57) ABSTRACT

A first device receives a first command for performing a first functionality on at least a second device, the first functionality comprising a plurality of constituent functionalities, wherein the second device is not configured to execute the first command. The first command is translated into a plurality of sub-commands for execution by respective devices. Each of the plurality of sub-commands, when executed, performs a respective constituent functionality of the plurality of constituent functionalities, and execution of any one of the sub-commands individually does not perform the entire first functionality. The first device manages execution of the plurality of sub-commands by the respective devices, wherein execution of the plurality of sub-commands by the respective devices emulates performance of the first functionality on at least the second device.

20 Claims, 19 Drawing Sheets

(56) References Cited

U.S. PATENT DOCUMENTS

| | | | |
|---|---|---|---|
| 5,838,226 A * | 11/1998 | Houggy | G08C 17/02 340/10.31 |
| 6,597,396 B1 * | 7/2003 | Quendt | H04N 1/6088 348/223.1 |
| 7,260,597 B1 | 8/2007 | Hofrichter et al. | |
| 7,352,930 B2 | 4/2008 | Lowles | |
| 7,570,485 B2 * | 8/2009 | Krah | G06F 1/1616 345/157 |
| 7,830,258 B2 | 11/2010 | McAllister | |
| 7,953,327 B2 | 5/2011 | Pereira et al. | |
| 7,961,674 B2 | 6/2011 | Jing et al. | |
| 7,965,983 B1 | 6/2011 | Swan et al. | |
| 8,049,434 B2 | 11/2011 | Crouse et al. | |
| 8,096,695 B2 | 1/2012 | Ong | |
| 8,156,500 B2 | 4/2012 | Helander | |
| 8,161,420 B2 | 4/2012 | Ding | |
| 8,204,979 B2 | 6/2012 | Vutharkar et al. | |
| 8,228,198 B2 | 7/2012 | McAllister | |
| 8,239,928 B2 | 8/2012 | Huang et al. | |
| 8,265,674 B2 | 9/2012 | Choong et al. | |
| 8,279,158 B2 | 10/2012 | Lowles et al. | |
| 8,295,990 B2 | 10/2012 | Venkatakrishnan et al. | |
| 8,370,370 B2 | 2/2013 | Huang et al. | |
| 8,406,819 B2 | 3/2013 | Steer et al. | |
| 8,407,347 B2 | 3/2013 | Zhang et al. | |
| 8,409,001 B2 | 4/2013 | Chang | |
| 8,471,500 B2 | 6/2013 | Fletcher et al. | |
| 8,478,450 B2 | 7/2013 | Lu et al. | |
| 8,508,465 B2 | 8/2013 | Broga et al. | |
| 8,519,844 B2 | 8/2013 | Richey et al. | |
| 8,543,688 B1 | 9/2013 | Ramamurthy | |
| 8,576,276 B2 | 11/2013 | Bar-zeev et al. | |
| 8,577,378 B2 | 11/2013 | Nagaraja et al. | |
| 8,606,645 B1 | 12/2013 | Applefeld | |
| 8,613,070 B1 | 12/2013 | Borzycki et al. | |
| 8,653,760 B1 * | 2/2014 | Pearce | H05B 33/0842 315/360 |
| 8,688,392 B2 | 4/2014 | Tam et al. | |
| 8,823,795 B1 | 9/2014 | Scalisi et al. | |
| 8,843,995 B2 | 9/2014 | Buckley et al. | |
| 8,942,694 B2 | 1/2015 | Woo | |
| 9,009,805 B1 | 4/2015 | Kirkby et al. | |
| 9,207,659 B1 | 12/2015 | Sami | |
| 9,325,516 B2 | 4/2016 | Pera et al. | |
| 9,326,126 B2 | 4/2016 | Yang | |
| 9,401,901 B2 | 7/2016 | Huang et al. | |
| 9,412,266 B2 | 8/2016 | Chen et al. | |
| 9,419,871 B2 | 8/2016 | Foley et al. | |
| 9,462,624 B2 | 10/2016 | Logue | |
| 9,479,504 B2 | 10/2016 | Bae et al. | |
| 9,488,994 B2 | 11/2016 | Zywicki et al. | |
| 9,528,861 B1 | 12/2016 | Haupt et al. | |
| 9,547,980 B2 | 1/2017 | Chen et al. | |
| 9,554,061 B1 | 1/2017 | Proctor, Jr. | |
| 9,800,429 B2 | 10/2017 | Crayford et al. | |
| 9,948,685 B2 | 4/2018 | Na et al. | |
| 10,262,210 B2 | 4/2019 | Kirkby et al. | |
| 2002/0016639 A1 | 2/2002 | Smith et al. | |
| 2002/0178385 A1 * | 11/2002 | Dent | G07C 9/00309 726/27 |
| 2003/0061284 A1 | 3/2003 | Mandarino et al. | |
| 2003/0067394 A1 * | 4/2003 | Tsui | E05F 15/43 340/686.1 |
| 2003/0169728 A1 | 9/2003 | Choi | |
| 2004/0083393 A1 | 4/2004 | Jordan et al. | |
| 2004/0243257 A1 | 12/2004 | Theimer | |
| 2005/0041686 A1 * | 2/2005 | Roy | H04L 51/066 370/466 |
| 2005/0281277 A1 | 12/2005 | Killian | |
| 2006/0109988 A1 * | 5/2006 | Metcalf | H04S 3/002 381/104 |
| 2006/0174102 A1 | 8/2006 | Smith et al. | |
| 2006/0259183 A1 | 11/2006 | Hayes et al. | |
| 2007/0014303 A1 | 1/2007 | Schulz et al. | |
| 2007/0105542 A1 | 5/2007 | Friedman | |
| 2007/0250592 A1 | 10/2007 | Reckamp et al. | |
| 2007/0294335 A1 | 12/2007 | Gershom | |
| 2008/0037444 A1 | 2/2008 | Chhabra | |
| 2008/0066093 A1 | 3/2008 | Igoe et al. | |
| 2008/0089300 A1 | 4/2008 | Yee | |
| 2008/0122606 A1 | 5/2008 | Bradley | |
| 2008/0168523 A1 | 7/2008 | Ansari et al. | |
| 2008/0219672 A1 | 9/2008 | Tam et al. | |
| 2008/0277486 A1 | 11/2008 | Seem et al. | |
| 2008/0278100 A1 * | 11/2008 | Hwang | H05B 37/0281 315/360 |
| 2009/0033485 A1 | 2/2009 | Naeve et al. | |
| 2009/0070681 A1 | 3/2009 | Dawes et al. | |
| 2009/0080896 A1 | 3/2009 | Pereira et al. | |
| 2009/0244097 A1 | 10/2009 | Estevez | |
| 2010/0068997 A1 | 3/2010 | Dunko | |
| 2010/0083356 A1 | 4/2010 | Steckley et al. | |
| 2010/0130166 A1 | 5/2010 | Tsuria et al. | |
| 2010/0138007 A1 | 6/2010 | Clark et al. | |
| 2010/0141153 A1 | 6/2010 | Recker et al. | |
| 2010/0150348 A1 | 6/2010 | Fairbanks et al. | |
| 2010/0192212 A1 | 7/2010 | Raleigh | |
| 2010/0246825 A1 | 9/2010 | Baras et al. | |
| 2010/0248707 A1 | 9/2010 | Hoffner et al. | |
| 2010/0283579 A1 | 11/2010 | Kraus et al. | |
| 2010/0283584 A1 | 11/2010 | McAllister | |
| 2011/0046798 A1 | 2/2011 | Imes et al. | |
| 2011/0107364 A1 | 5/2011 | Lajoie et al. | |
| 2011/0121654 A1 | 5/2011 | Recker et al. | |
| 2011/0172844 A1 | 7/2011 | Choong et al. | |
| 2011/0199004 A1 | 8/2011 | Henig et al. | |
| 2011/0202151 A1 | 8/2011 | Covaro et al. | |
| 2011/0225373 A1 | 9/2011 | Ito et al. | |
| 2012/0011567 A1 | 1/2012 | Cronk et al. | |
| 2012/0045060 A1 | 2/2012 | Maestrini et al. | |
| 2012/0049765 A1 | 3/2012 | Lu et al. | |
| 2012/0082062 A1 | 4/2012 | McCormack | |
| 2012/0144469 A1 | 6/2012 | Ainslie et al. | |
| 2012/0167063 A1 | 6/2012 | Detwiler et al. | |
| 2012/0204243 A1 | 8/2012 | Wynn et al. | |
| 2012/0216296 A1 | 8/2012 | Kidron | |
| 2012/0239936 A1 | 9/2012 | Holtmanns et al. | |
| 2013/0026947 A1 | 1/2013 | Economy et al. | |
| 2013/0064132 A1 | 3/2013 | Low et al. | |
| 2013/0073705 A1 | 3/2013 | Hester | |
| 2013/0076491 A1 | 3/2013 | Brandsma et al. | |
| 2013/0041516 A1 | 4/2013 | Rockenfeller et al. | |
| 2013/0086665 A1 | 4/2013 | Filippi et al. | |
| 2013/0124855 A1 | 5/2013 | Varadarajan et al. | |
| 2013/0191755 A1 | 7/2013 | Balog et al. | |
| 2013/0198786 A1 | 8/2013 | Cook et al. | |
| 2013/0227656 A1 | 8/2013 | Holtmanns et al. | |
| 2013/0236183 A1 | 9/2013 | Chao et al. | |
| 2013/0268357 A1 | 10/2013 | Heath | |
| 2013/0276140 A1 | 10/2013 | Coffing et al. | |
| 2013/0340050 A1 | 12/2013 | Harrison | |
| 2014/0007222 A1 | 1/2014 | Qureshi et al. | |
| 2014/0068705 A1 | 3/2014 | Chambers et al. | |
| 2014/0068789 A1 | 3/2014 | Watts et al. | |
| 2014/0099933 A1 | 4/2014 | Yerrabommanahalli et al. | |
| 2014/0129006 A1 | 5/2014 | Chen et al. | |
| 2014/0137188 A1 | 5/2014 | Bartholomay et al. | |
| 2014/0157370 A1 | 6/2014 | Plattner et al. | |
| 2014/0164758 A1 * | 6/2014 | Ramamurthy | G06F 21/6218 713/150 |
| 2014/0164776 A1 | 6/2014 | Hook et al. | |
| 2014/0173692 A1 | 6/2014 | Srinivasan et al. | |
| 2014/0189359 A1 | 7/2014 | Marien et al. | |
| 2014/0189808 A1 | 7/2014 | Mahaffey et al. | |
| 2014/0245411 A1 | 8/2014 | Meng et al. | |
| 2014/0245461 A1 | 8/2014 | O'Neill et al. | |
| 2014/0248852 A1 | 9/2014 | Raleigh et al. | |
| 2014/0266600 A1 * | 9/2014 | Alberth, Jr. | G05B 11/01 340/5.83 |
| 2014/0273963 A1 | 9/2014 | Su et al. | |
| 2014/0281497 A1 | 9/2014 | Medvinsky et al. | |
| 2014/0282570 A1 | 9/2014 | Prasanna | |
| 2014/0282877 A1 | 9/2014 | Mahaffey et al. | |

(56) References Cited

U.S. PATENT DOCUMENTS

| | | | |
|---|---|---|---|
| 2014/0310509 A1 | 10/2014 | Potlapally et al. | |
| 2014/0310510 A1 | 10/2014 | Potlapally et al. | |
| 2015/0015369 A1* | 1/2015 | Lamb | E05F 15/77 340/5.71 |
| 2015/0043377 A1 | 2/2015 | Cholas et al. | |
| 2015/0071052 A1 | 3/2015 | Hershberg et al. | |
| 2015/0126153 A1 | 5/2015 | Spitz et al. | |
| 2015/0160634 A1* | 6/2015 | Smith | H04N 21/4263 700/90 |
| 2015/0177292 A1 | 6/2015 | Silveira Filho et al. | |
| 2015/0195100 A1 | 7/2015 | Imes et al. | |
| 2015/0215297 A1 | 7/2015 | Rathod et al. | |
| 2015/0249855 A1 | 9/2015 | Dewa et al. | |
| 2015/0282216 A1 | 10/2015 | Reshef et al. | |
| 2016/0044032 A1 | 2/2016 | Kim et al. | |
| 2016/0089457 A1* | 3/2016 | Liao | A61L 2/10 250/504 R |
| 2016/0132031 A1 | 5/2016 | Kozura et al. | |
| 2016/0142263 A1 | 5/2016 | Erdmann et al. | |
| 2016/0191264 A1 | 6/2016 | Kim et al. | |
| 2016/0370208 A1* | 12/2016 | Patel | G01D 9/38 |
| 2016/0380945 A1 | 12/2016 | Wood et al. | |
| 2016/0381500 A1 | 12/2016 | Larson | |
| 2017/0285893 A1* | 10/2017 | Shim | G06F 3/0482 |

OTHER PUBLICATIONS

Google Inc., International Search Report and Written Opinion, PCT/US2015/053291, dated Feb. 5, 2016, 18 pgs.

Google Inc., International Search Report and Written Opinion, PCT/US2015/060405, dated Feb. 25, 2016, 9 pgs.

Goadrich, Mark H., and Michael P. Rogers. "Smart smartphone development: iOS versus Android." In Proceedings of the 42nd ACM technical symposium on Computer science education, pp. 607-612. ACM, 2011.

Manashty, Ali Reza, Amir Rajabzadeh, and Zahra Forootan Jahromi. "A Scenario-Based Mobile Application for Robot-Assisted Smart Digital Homes." arXiv preprint arXiv:1009.5398 (2010).

Armac, Ibrahim, and Daniel Retkowitz. "Simulation of smart environments." In IEEE International Conference on Pervasive Services, pp. 257-266. IEEE, 2007.

Ramlee, Ridza Azri, Man Hong Leong, Ranjit Singh A. Sarban Singh, Mohd Muzafar Ismail, Mohd Azlishah Othman, Hamzah Asyrani Sulaiman, Mohamad Harris Misran, Meor Said, and Maizatul Alice. "Bluetooth remote home automation system using android application." (2013): 1-5.

Van Nguyen, Tam, Jin Gook Kim, and Deokjai Choi. "ISS: the interactive smart home simulator." In Advanced Communication Technology, 2009. ICACT 2009. 11th International Conference on, vol. 3, pp. 1828-1833. IEEE, 2009.

Rajabzadeh, Amir, Ali Reza Manashty, and Zahra Forootan Jahromi. "A Mobile Application for Smart House Remote Control System." arXiv preprint arXiv:1009.5557 (2010).

Gavalas, Damianos, and Daphne Economou. "Development platforms for mobile applications: Status and trends." IEEE software 28, No. 1 (2011): 77-86.

Y. Zatout, "Using wireless technologies for healthcare monitoring at home: A survey," 2012 IEEE 14th International Conference on e-Health Networking, Applications and Services (Healthcom), Beijing, 2012, pp. 383-386. URL: http://ieeexplore.ieee.org/stamp/stamp.jsp?tp=&arnumber=6379443&isnumber=6379371.

"INSTEON Compared" www.insteon.com/pdf/insteoncompared.pdf version.2 2013.

"Thread Group Information Event" https://www.threadgroup.org/Portals/0/documents/events/ThreadIntro.pdf; Sep 30, 2014.

* cited by examiner

DATA PROCESSING SYSTEMS AND METHODS FOR SMART HUB DEVICES

PRIORITY CLAIM AND RELATED APPLICATIONS

This application claims priority to U.S. Provisional Patent Application No. 62/078,912, filed Nov. 12, 2014, which is hereby incorporated by reference in its entirety.

This application is related to U.S. patent application Ser. No. 14/940,135, filed Nov. 12, 2015, entitled "Systems and Methods for Commissioning a Smart Hub Device," now U.S. Pat. No. 10,075,334, issued Sep. 11, 2018, U.S. patent application Ser. No. 14/939,629, filed Nov. 12, 2015, entitled "Data Communication Systems and Methods for Smart Hub Devices," and U.S. patent application Ser. No. 14/940,139, filed Nov. 12, 2015, entitled "User Interfaces, Systems and Methods for Configuring Smart Devices for Interoperability With a Smart Hub Device," now U.S. Pat. No. 10,397,013, issued Aug. 27, 2019, all of which are hereby incorporated by reference in their entirety.

TECHNICAL FIELD

This relates generally to computer technology, including but not limited to methods and systems for provisioning an electronic device by associating a user account with the electronic device and establishing a secure network connection for the electronic device.

BACKGROUND

Smart home automation devices are being developed and fielded at such a rapid pace that new devices appear on the market practically every day. Because of the proliferation of low-power wireless network and smart phone technologies, it is not uncommon to find home and business owners in possession of smart home devices such as wireless lights, music systems, door locks, thermostats and alarm systems. And wireless white goods are just over the horizon. Based on current trends, it is expected that the average consumer will own as many as five to ten smart home devices in just a few years.

One issue with this proliferation of devices is that many such smart home devices use different communication protocols (e.g., Z-Wave, ZigBee or Insteon) so devices that use different protocols cannot interoperate seamlessly out of the box. In addition, many such devices are configured with different set-up procedures (sometimes called commissioning or provisioning procedures) depending on one or more of: the type of the device, capabilities of the device (e.g., degree of smartness of the device) and/or the particular communication protocol employed by that device. As a result, owners of these devices often face a confusing experience every time they attempt to configure and/or commission a new device. Furthermore, different devices of the same type (e.g., thermostats) can have different capabilities, so users might not have access to expected or desirable product features for a particular type of device depending on the specific device they purchased.

Therefore, it would be desirable to develop user-friendly solutions to address the above-recited issues associated with smart home devices.

SUMMARY

Accordingly, there is a need for methods, systems, devices, and interfaces for emulating advanced functionality on devices. By translating a command for an advanced functionality into sub-commands that, when executed, perform respective constituent functionalities, execution of sub-commands by respective devices can be managed such that the advanced functionality is emulated on a device that does not individually have such capabilities. Advantageously, devices—despite their inherent capability—can emulate advanced functionalities by coordinating and using the capabilities of multiple devices.

In one aspect, in accordance with some implementations, a method is performed at a first device (e.g., a hub device) with one or more processors and memory storing instructions for execution by the one or more processors. The method includes receiving a first command for performing a first functionality on at least a second device, the first functionality comprising a plurality of constituent functionalities, wherein the second device is not configured to execute the first command. The first command is translated into a plurality of sub-commands for execution by respective devices. Each of the plurality of sub-commands, when executed, performs a respective constituent functionality of the plurality of constituent functionalities, and execution of any one of the sub-commands individually does not perform the entire first functionality. The first device manages execution of the plurality of sub-commands by the respective devices, wherein execution of the plurality of sub-commands by the respective devices emulates performance of the first functionality on at least the second device.

In accordance with some implementations, a first device (e.g., a hub device) includes one or more processors, memory, and one or more programs; the one or more programs are stored in the memory and configured to be executed by the one or more processors. The one or more programs include instructions for performing the operations of the method described above. In accordance with some implementations, a non-transitory computer-readable storage medium has stored therein instructions that, when executed by the first device, cause the electronic device to perform the operations of the method described above. In accordance with some implementations, a device includes means for performing the operations of the method described above.

In another aspect, in accordance with some implementations, a first functionality to be performed on a first device is identified, the first functionality comprising a plurality of constituent functionalities. Respective sets of functionalities are obtained for a plurality of devices including the first device. Two or more devices, of the plurality of devices and including the first device, having respective sets of functionalities that together include the plurality of constituent functionalities are then identified. Furthermore, a plurality of sub-commands is generated, each of the plurality of sub-commands for execution by a corresponding device of the two or more devices. Execution of a respective one of the plurality of sub-commands enables performance of a respective one of the plurality of constituent functionalities, and execution of the plurality of sub-commands emulates performance of the first functionality on at least the first device.

Devices are therefore provided with the ability to emulate advanced functionalities, thereby increasing the effectiveness and user satisfaction with such devices.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
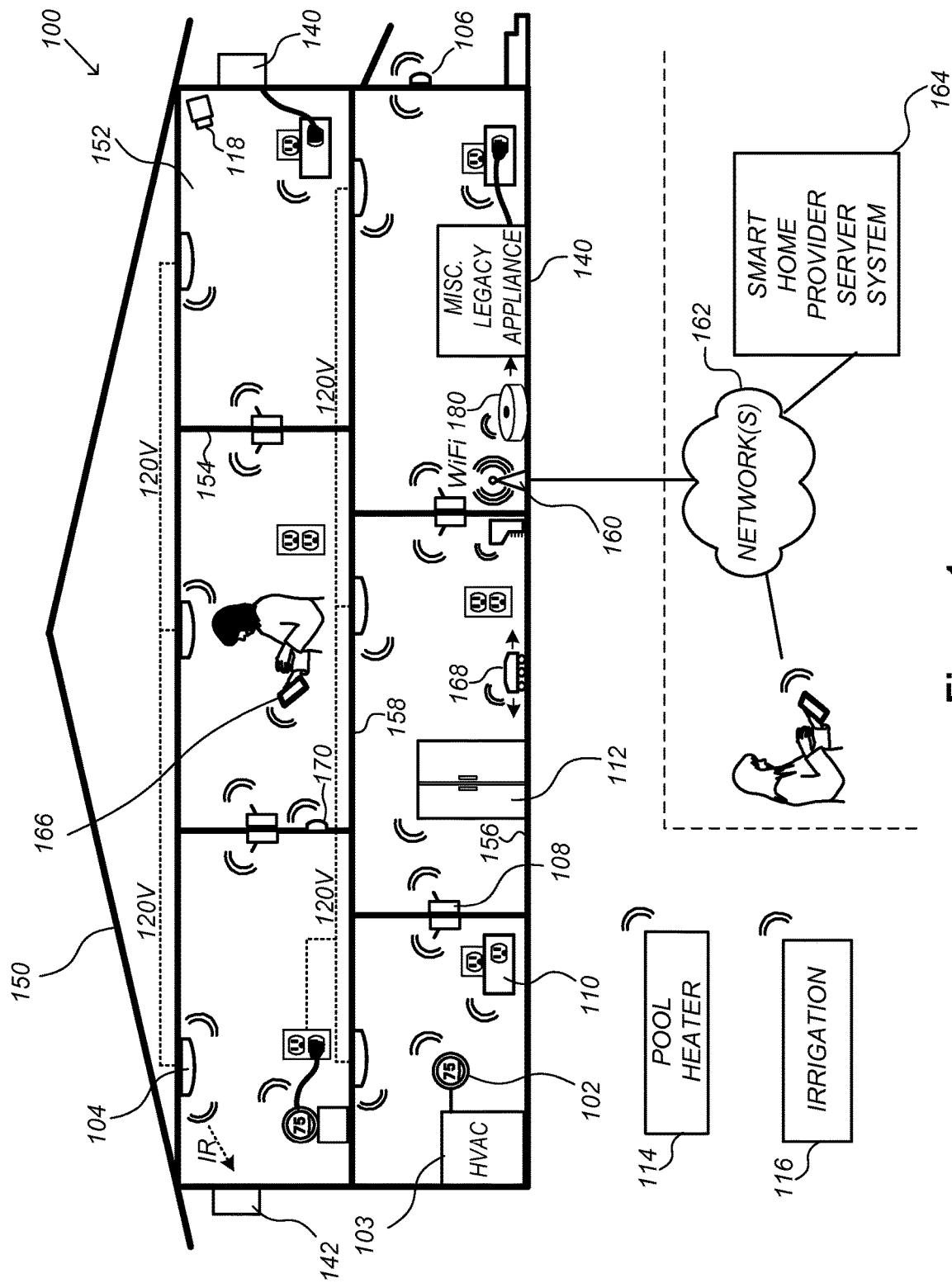
FIG. 1 is an exemplary smart home environment in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first type of request could be termed a second type of request, and, similarly, a second type of request could be termed a first type of request, without departing from the scope of the various described implementations. The first type of request and the second type of request are both types of requests, but they are not the same type of request.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an exemplary smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven (e.g., a smart appliance 112). A thermal radiation sensor may determine the temperature of the respective heat source (or a portion thereof) at which it is directed and may provide corresponding blackbody radiation data as output.

The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gate). The smart home environment 100 may additionally or alternatively include one or more other occupancy sensors (e.g., the smart doorbell 106, smart doorlocks, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a mobile phone, such as a smart phone) 166. A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116 and/or 118 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub.

Generally, in some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using a radio communication network available at least in the smart home environment 100.

Figure 2:
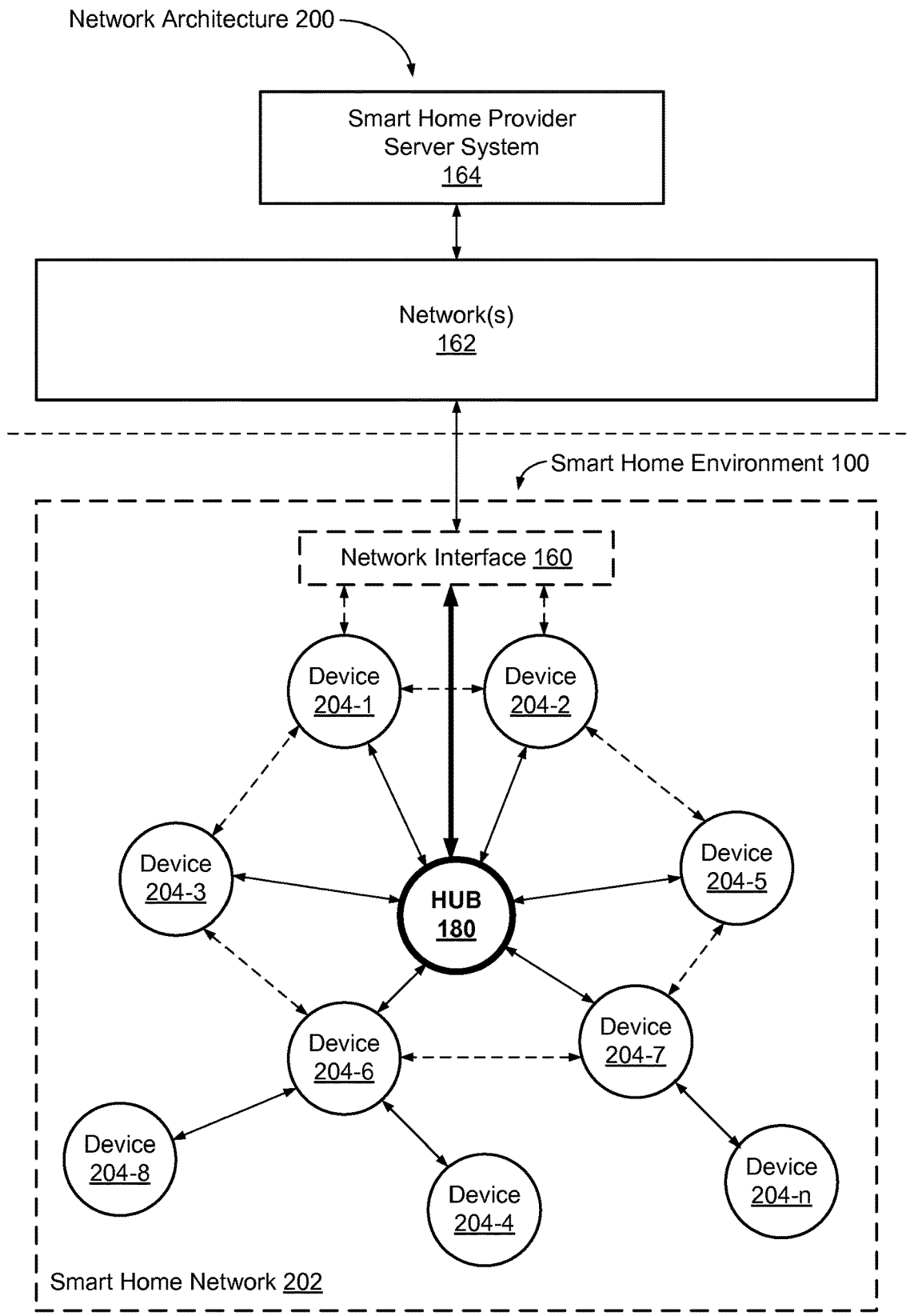
FIG. 2 is a block diagram illustrating an exemplary network architecture that includes a smart home network in accordance with some implementations.

FIG. 2 is a block diagram illustrating an exemplary network architecture 200 that includes a smart home network 202 in accordance with some implementations. In some implementations, the smart devices 204 in the smart home environment 100 (e.g., devices 102, 104, 106, 108, 110, 112, 114, 116 and/or 118) combine with hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. The hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
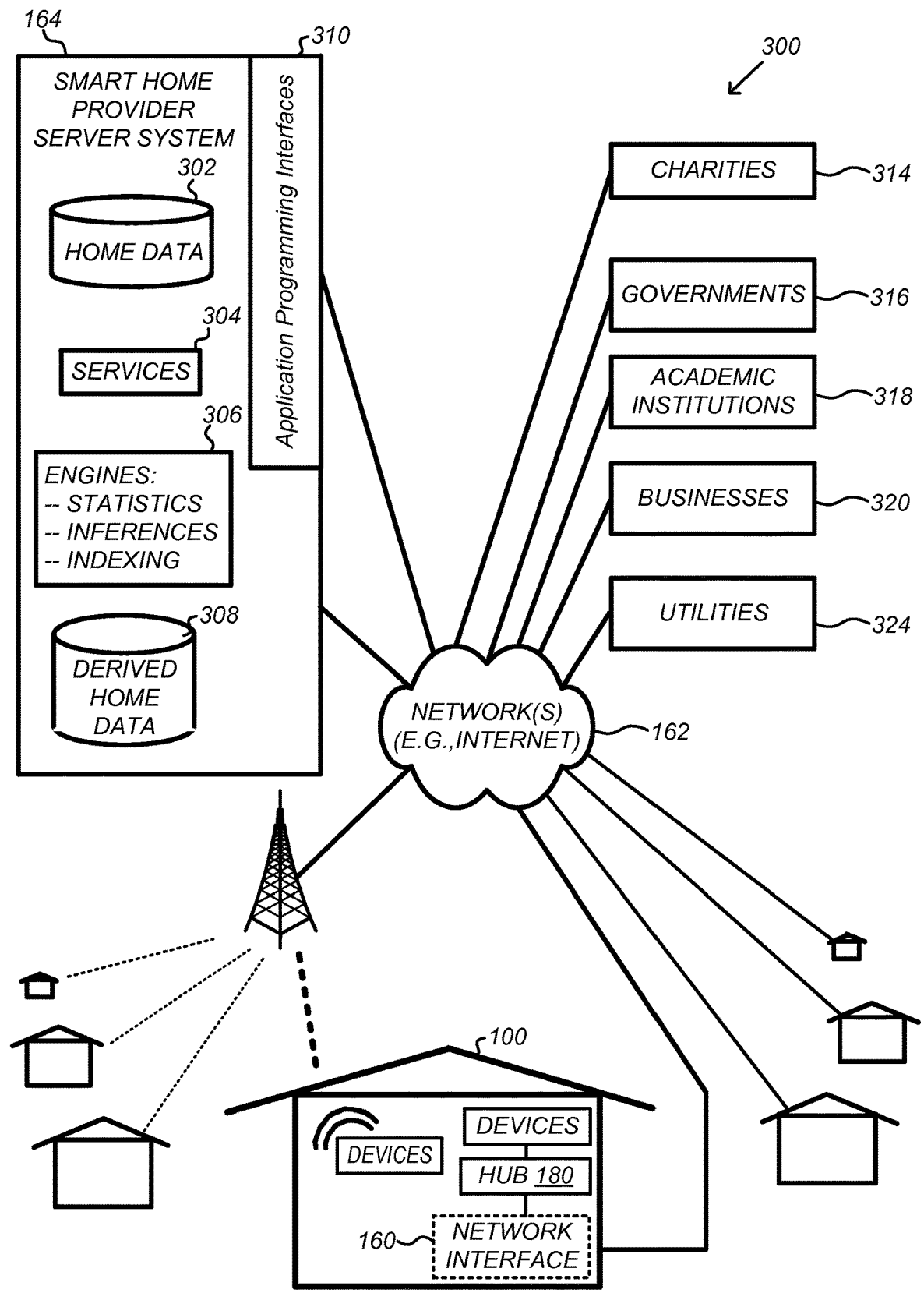
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Exemplary collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Exemplary services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
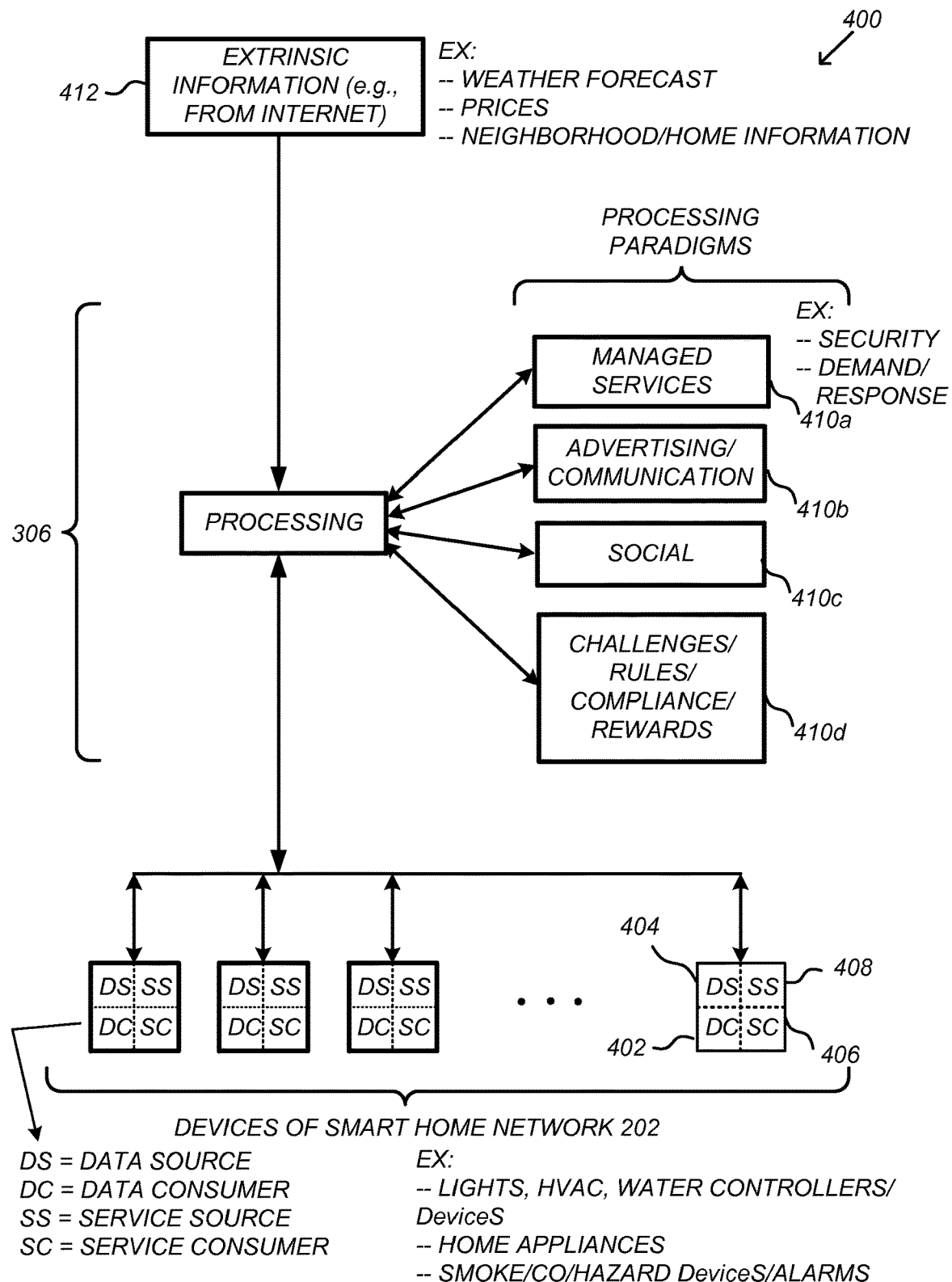
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
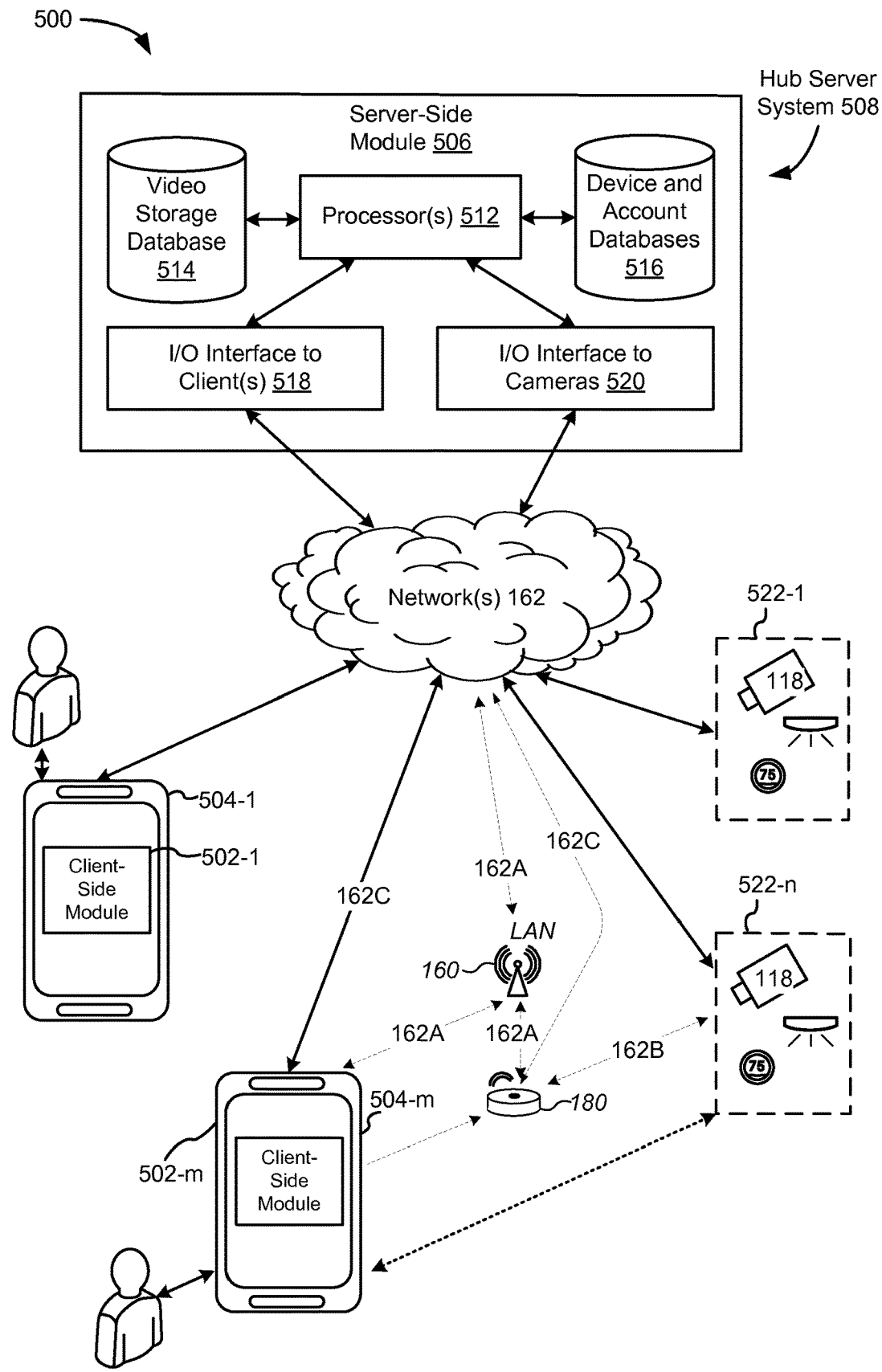
FIG. 5 is a representative operating environment in which a hub server system interacts with client devices and hubs communicatively coupled to local smart devices in accordance with some implementations.

FIG. 5 illustrates a representative operating environment 500 in which a hub server system 508 provides data processing for monitoring and facilitating review of motion events in video streams captured by video cameras 118. As shown in FIG. 5, the hub server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub server system 508. In some implementations, the hub server system 508 is a dedicated video processing server that provides video processing services to video sources and client devices 504 independent of other services provided by the hub server system 508.

In some implementations, each of the video sources 522 includes one or more video cameras 118 that capture video and send the captured video to the hub server system 508 substantially in real-time. In some implementations, each of the video sources 522 optionally includes a controller device (not shown) that serves as an intermediary between the one or more cameras 118 and the hub server system 508. The controller device receives the video data from the one or more cameras 118, optionally, performs some preliminary processing on the video data, and sends the video data to the hub server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub server system 508.

As shown in FIG. 5, in accordance with some implementations, each of the client devices 504 includes a client-side module 502. The client-side module 502 communicates with a server-side module 506 executed on the hub server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub server system 508 is implemented on one or more standalone data processing apparatuses or a distributed network of computers. In some implementations, the hub server system 508 also employs various virtual devices and/or services of third party service providers (e.g., third-party cloud service providers) to provide the underlying computing resources and/or infrastructure resources of the hub server system 508. In some implementations, the hub server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub server system 508 can vary in different implementations. For example, in some implementations, client-side module 502 is a thin-client that provides only user-facing input and output processing functions, and delegates all other data processing functionalities to a backend server (e.g., the hub server system 508). Similarly, in some implementations, a respective one of the video sources 522 is a simple video capturing device that continuously captures and streams video data to the hub server system 508 without no or limited local preliminary processing on the video data. Although many aspects of the present technology are described from the perspective of the hub server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub server system 508, the client device 504, and the video sources 522 cooperatively.

It should be understood that operating environment 500 that involves the hub server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an exemplary smart home environment, two or more devices (e.g., the network interface device 160, the hub device 180, and the client devices 504-$m$) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B via which at least some of the electronic devices 522-$m$ exchange data with the hub device 160. Alternatively, in some situations, some of the electronic devices 522-$m$ communicate with the network interface device 160 directly via the same sub-network 162A that couples devices 160, 180 and 504-$m$. In some implementations (e.g., in the network 162C), both the client device 504-$m$ and the electronic devices 522-$n$ communicate directly via the network(s) 162 without passing the network interface device 160 or the hub device 180.

In some implementations, during normal operation, the network interface device 160 and the hub device 180 communicate with each other to form a network gateway through which data are exchanged with the electronic device 522-$n$. As explained above, the network interface device 160 and the hub device 180 optionally communicate with each other via a sub-network 162A. However, a provisioning process is required to establish the communication between the network interface device 160 and the hub device 180 via the sub-network 162A. Specifically, a new hub device 180 has to receive a network identification and a network password associated with the sub-network 162A, such that the hub device 180 could communicate device information of the hub device 180 to the server 508 and allow the server 508 to associate the hub device 180 with one or more user accounts.

In some implementations, at least an optical link is formed between the client device 504-m and the hub device 180. The client device 504-m is configured to generate optical data (e.g., light flashes) coded with network information and user account information. The hub device 180 includes a light sensor that captures the optical data and recovers the network and user account information. Then, the hub device 180 uses the recovered network and user account information to access the sub-network 162A, the network(s) 162 and the server 508 and associate with a user account on the server 508.

Figure 6:
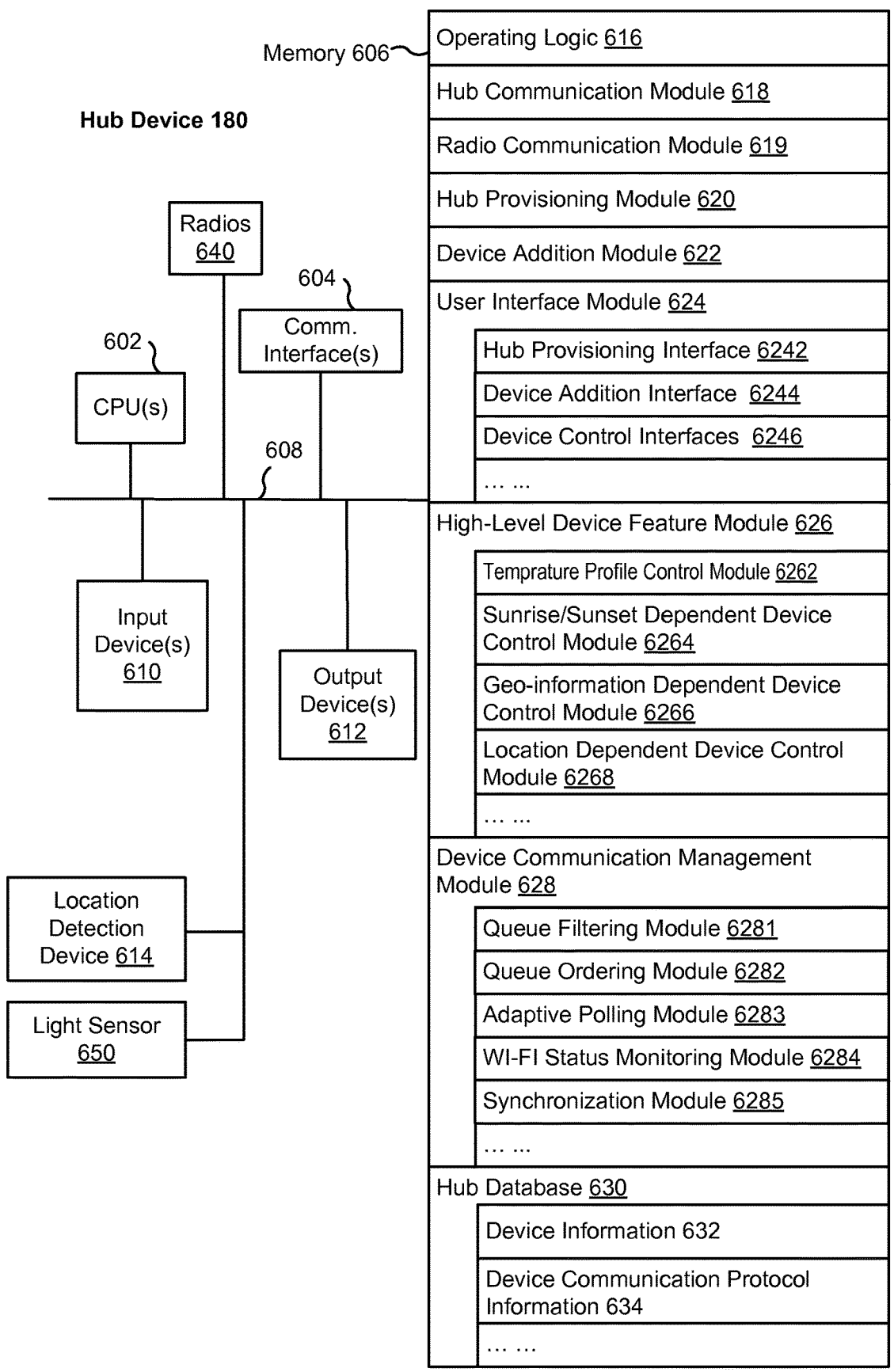
FIG. 6 is a block diagram illustrating a representative hub device in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, light sensor 650, and one or more communication buses 508 for interconnecting these components (sometimes called a chipset). In some implementations, the electronic device 602 includes one or more input devices 610 such as one or more buttons for receiving input. In some implementations, the electronic device 602 includes one or more output devices 612 such as one or more indicator lights, a sound card, a speaker, a small display for displaying textual information and error codes, etc. Furthermore, some the electronic device 602 uses a microphone and voice recognition or a camera and gesture recognition to supplement or replace the keyboard. In some implementations, the electronic device 602 includes a location detection device 614, such as a GPS (global positioning satellite) or other geo-location receiver, for determining the location of the electronic device 602.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. The light sensor 650 senses light flashes from a device that is placed in proximity to the light sensor 650.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 619 for connecting the hub device 180 to other client devices (e.g., controller devices, smart devices 204 in smart home environment 100) via one or more radio communication devices (e.g., radios 640)
- Hub provisioning module 620 for provisioning the hub and electronic devices, which optionally includes: an account hub device link module (not shown) for associating one or more electronic devices 522 or hub 180 with a corresponding user account, and a secure network setup module (not shown) for setting up secure network connections for both the hub and the electronic devices;
- Device addition module 622 for adding a new electronic device (e.g., smart device 204-1 in smart home environment 100, FIG. 1) after a hub has been properly set up;
- User interface module 624, including but not limited to:
  - Hub provisioning interface 6242 for providing and displaying a user interface during the device provisioning process (e.g., performed by hub provisioning module 620);
  - Sensor addition interface 6244 for providing and displaying a user interface when a new device is being added (e.g., performed by device addition module 622); and
  - Sensor control interfaces 6246 for providing and displaying a user interface in which settings, captured data, and/or other data for one or more sensor devices (e.g., light sensor 650) can be modified and/or viewed;
- High-level device feature module 626, including but not limited to:
  - Temperature profile control module 6262 for creating and maintaining temperature profiles of one or more devices (e.g., one or more smart devices in smart home environment 100), wherein temperature profiles include operations settings (e.g., scheduling) for manipulating the temperature of the one or more devices;
  - Sunrise/sunset dependent sensor control module 6264 for computing (e.g., based on information retrieved from geo-information dependent sensor control module 6266, and/or location dependent sensor control module 6268) sunrise and/or sunset times, and accordingly adjusting operations settings for one or more devices (e.g., dimming a light, closing a smart curtain, adjusting a thermostat, etc.);
  - Geo-information dependent sensor control module 6266 for detecting surrounding environmental characteristics of hub device 180, such as information of surrounding terrain (e.g., mountain ranges, desert, etc.) and/or nearby obstructions (e.g., tall buildings, trees, etc.);

Location dependent sensor control module 6268 for detecting a location of hub device 180 (e.g., GPS coordinates); and Optional modules for executing commands and/or subcommands for performing one or more functionalities, such as a timer module for identifying an elapsed time (e.g., since commencing a garage door operation);

Sensor communication management module 628, including but not limited to:

Queue filtering module 6281 for manipulating and processing commands received from one or more devices (e.g., splitting commands into commands for specific devices, translating commands in accordance with protocols of corresponding devices, etc.)

Queue ordering module 6282 for determining an order of commands (e.g., received and processed by queue filtering module 6281) in a command queue of hub device 180;

Adaptive polling module 6283 for storing device information (e.g., device type, protocol, application state, changes to device state, time of last poll, etc. of smart devices in smart home environment 100, FIG. 1), configuring polling modes (e.g., frequency of polling), and sending polling commands to the one or more devices;

Wi-Fi Status monitoring module 6284 for determining a status of one or more communication interfaces 604 (e.g., Wi-Fi);

Synchronization module 6285 for receiving messages from, and transmitting messages to, one or more devices (e.g., smart devices in smart home environment 100, FIG. 1), wherein messages include control requests (e.g., a command to adjust thermostat), responses, and state information (e.g., information conveying changes in device state); and Hub database 630, including but not limited to:

Sensor information 632 for storing and managing data received, detected, and/or transmitted by one or more sensors (e.g., light sensor 650) of hub device 180; and Sensor communication protocol information 634 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
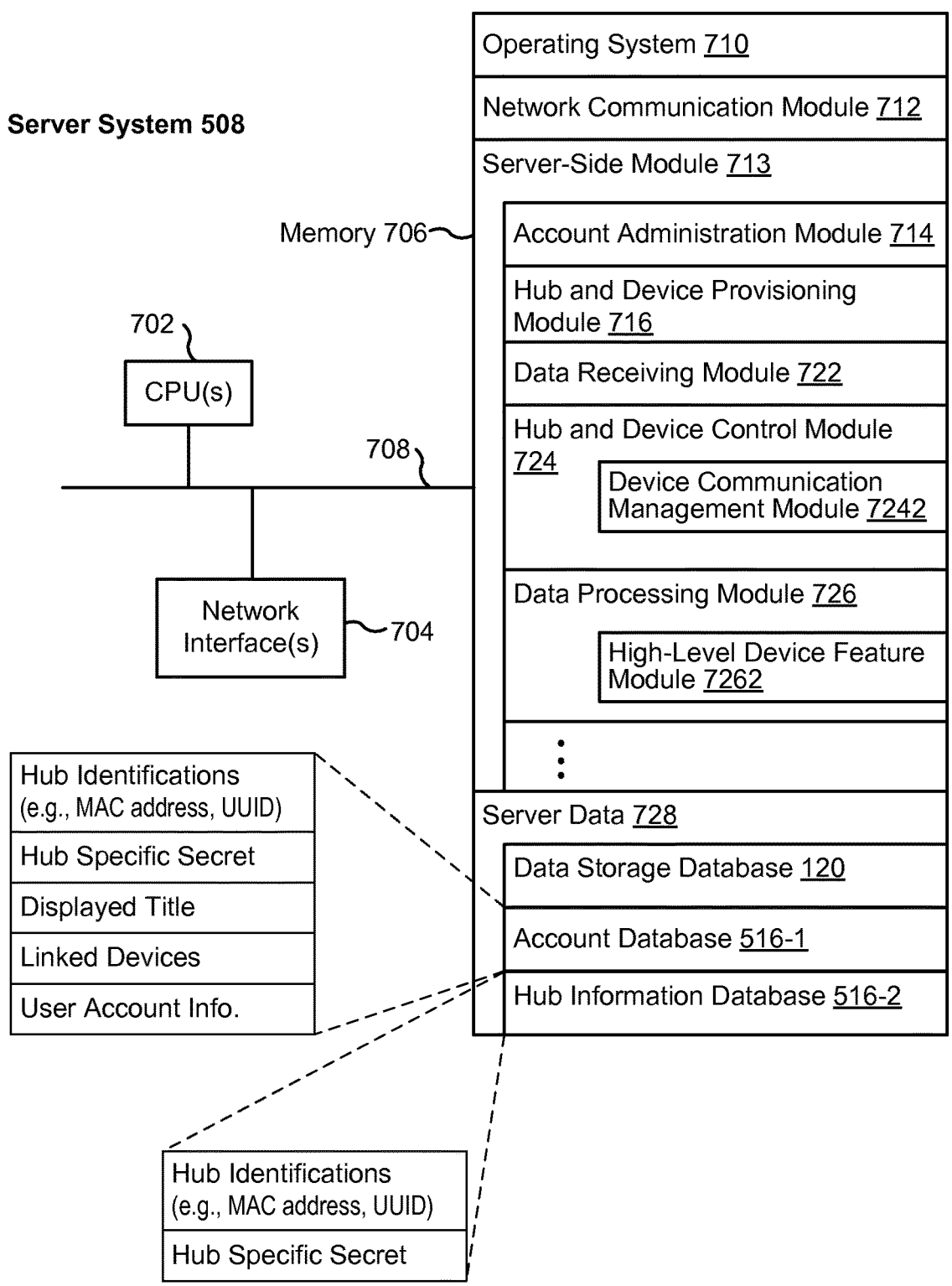
FIG. 7 is a block diagram illustrating server system in accordance with some implementations.

FIG. 7 is a block diagram illustrating the server system 508 in accordance with some implementations. The server system 508, typically, includes one or more processing units (CPUs) 702, one or more network interfaces 704 (e.g., including I/O interface to one or more clients 86 and I/O interface to one or more the electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the server system 508 to other client devices (e.g., the client devices and the electronic devices (including e.g., cameras) connected to one or more networks 162 via one or more network interfaces 704 (wired or wireless);

Server-side module 713, which provides server-side functionalities for account management, device provision, device control, data processing and data review, including but not limited to:

Account administration module 714 for creating user accounts, and providing account login-services to client devices;

Hub and device provisioning module 716 for provisioning hubs and electronic devices (sometimes in cooperation with the account registration module 714), which optionally includes: an account hub device link module (not shown) for associating one or more electronic devices 522 or hub 180 with a corresponding user account, a secure network setup module (not shown) for setting up secure network connections for both the hub and the electronic devices, and a device addition module (not shown) for adding a new smart electronic device after a hub has been properly set up;

Data receiving module 722 for receiving data (e.g., video data) from electronic devices via the hub device, and preparing the received data for further processing and long-term storage in the data storage database 120;

Hub and device control module 724 for generating and sending server-initiated control commands to modify operation modes of the electronic devices, and/or receiving and forwarding user-initiated control commands to modify operation modes of the electronic devices, wherein the hub and device control module 86 at least includes a device communication management module 7242;

Data processing module 726 for processing the data provided by the electronic devices such that the processed data could be forwarded to a client device and reviewed by a user who logs onto a corresponding user account on the specific client device, wherein in some implementations, the data processing module 726 includes a high-level device feature module 7262; and server data 736 storing data for use in account management, hub provision and control, device provision and control, data processing and data review, including but not limited to:

Data storage database 120 for storing data associated with each electronic device 802 (e.g., each camera) of each user account, as well as data processing models, processed data results, and other relevant metadata (e.g., names of data results, location of electronic device 802, creation time, duration, settings of the electronic device 802, etc.) associated with the data, wherein (optionally) all or a portion of the data and/or processing associated with the hub 180 or smart devices stored securely;

Account database 516-1 for storing account information for user accounts, including user account information, information for linked hubs and electronic devices (e.g., hub identifications), hub specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 516-2 for storing device information related to one or more hub devices, e.g., device identifiers and hub specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
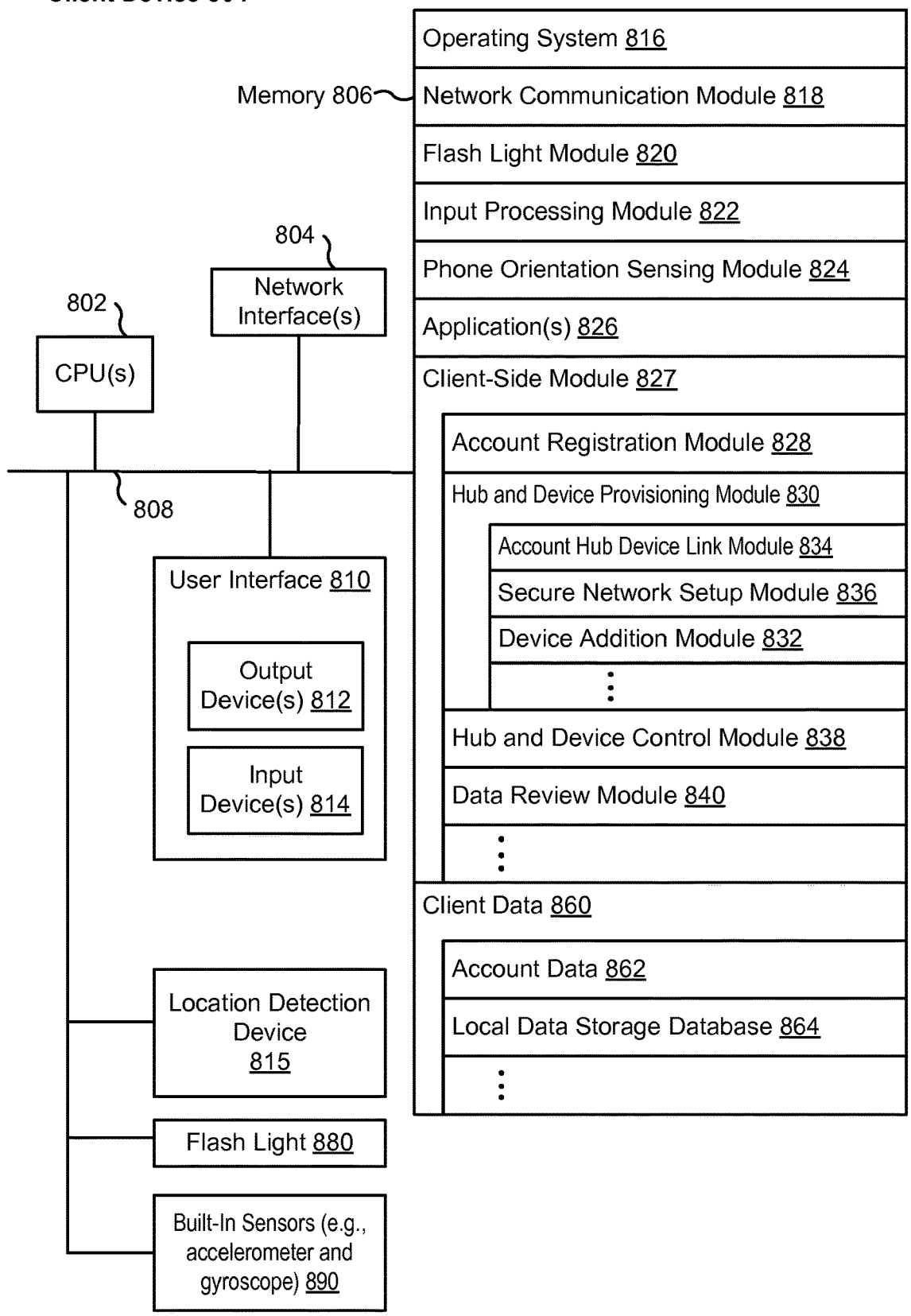
FIG. 8 is a block diagram illustrating a representative client device associated with a user account in accordance with some implementations.

FIG. 8 is a block diagram illustrating a representative client device 504 associated with a user account in accordance with some implementations. The client device 604, typically, includes one or more processing units (CPUs) 802, one or more network interfaces 804, memory 806, and one or more communication buses 808 for interconnecting these components (sometimes called a chipset). The client device also includes a user interface 810, a flash light 880, and one or more built-in sensors 890 (e.g., accelerometer and gyroscope). User interface 810 includes one or more output devices 812 that enable presentation of media content, including one or more speakers and/or one or more visual displays. Optionally, output devices 812 (e.g., a visual display) is used for sending signals (e.g., to light sensor 650 of hub 180) during a provisioning/commissioning process. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images, for example, of graphic series codes printed on the electronic devices. Optionally, the client device includes a location detection device 815, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 816 including procedures for handling various basic system services and for performing hardware dependent tasks;

Network communication module 818 for connecting the client device to other client devices (e.g., server system 508 and the electronic devices) connected to one or more networks 162 via one or more network interfaces 804 (wired or wireless);

Flash light module 820 for producing flashes of light (e.g., for detection by light sensor 650 of hub 180) as signals during a provisioning/commissioning process;

Input processing module 822 for detecting one or more user inputs or interactions from one of the one or more input devices 814 and interpreting the detected input or interaction;

Phone orientation sensing module 824 for determining the orientation of the client device 504 based on data sensed by the built-in sensors 890;

One or more applications 826 for execution by the client device (e.g., games, social network applications, smart home applications, and/or other web or non-web based applications) for controlling hubs and electronic devices (e.g., sending commands, configuring settings, etc.) and for reviewing data captured by the electronic devices (e.g., device status and settings, captured data, or other information regarding the hub or other connected devices);

Client-side module 827, which provides client-side functionalities for device provisioning, device control, data processing and data review, including but not limited to:

Account registration module 828 for establishing a user account;

Hub and device provisioning module 830 that provisions hubs and electronic devices (sometimes in cooperation with the account registration module 828) and includes an account hub device link module 834 for associating one or more electronic devices 522 or hub 180 with a corresponding user account, a secure network setup module 836 for setting up secure network connections for both the hub and the electronic devices, and a device addition module 832 for adding a new smart electronic device after a hub has been properly set up;

Hub and device control module 838 for generating control commands for modifying an operating mode of the hub or the electronic devices in accordance with user input; and Data review module 840 for providing user interfaces for reviewing the data that are processed by server system 508 and displayed on the display of the client device; and client data 860 storing data associated with the user account and electronic devices, including, but is not limited to:

Account data 862 storing information related with both user accounts loaded on the client device 604 and electronic devices 522 associated with the user accounts, wherein such information includes cached login credentials, hub identifiers (e.g., MAC addresses and UUIDs), electronic device identifiers (e.g., MAC addresses and UUIDs), user interface settings, display preferences, authentication tokens and tags, password keys, etc.; and Local data storage database 864 for selectively storing raw or processed data associated with electronic devices 522 (e.g., a camera) that has been linked to the user accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the server system 508 are performed by the client device 604, and the corresponding sub-modules of these functions may be located within the client device rather than server system 508. In some implementations, at least some of the functions of the client device are performed by the server system 508, and the corresponding sub-modules of these functions may be located within the server system 508 rather than client device 604. The client device 604 and the server system 508 shown in FIGS. 7 and 8, respectively, are merely illustrative, and different configurations of the modules for implementing the functions described herein are possible in various implementations.

Enabling High-Level Features to Devices with Lower Levels of Functionality

Connected devices of the same fundamental type come with a variety of actual capabilities or functionalities. For example, one thermostat type may only enable adjustments to temperature, while other types may include advanced features such as device scheduling (e.g., running HVAC system at a particular time each day). Some implementations enable the capabilities of less capable devices to be extended to match or even exceed those of more capable devices of the same type through the use smart programming in the hub device 180 (or remote servers/cloud computers, other devices in the smart home environment, etc.) to which the connected device is coupled and controlled.

The techniques and methods described below enable the following extensions to the capabilities of various connected devices:

(1) Through advanced learning capabilities and other techniques, a hub device (or remote servers/cloud computers, other devices in the smart home environment, etc.) intercepts advanced commands and emulates the advanced capability, using a combination of simple capabilities, to provide advanced functionality from/to less sophisticated devices.

(2) The hub (or remote servers/cloud computers, other devices in the smart home environment, etc.) presents, to a mobile device (e.g., a user controller electronic device 166, FIG. 1), an interface for a given device type that contains the capabilities of the most capable particular device of that type (even if the actual device provides less than the full set of those capabilities).

(3) Multiple simple devices can be combined into a single "virtual device" with the capability of a more complex device type. (For example, separate single-purpose weather sensing devices such as a connected thermometer, barometer and wind gauge can be represented by and controlled from the hub 180 device as if they were a more sophisticated connected home weather station).

In many cases, a device description maintained in the hub 180 (or remote servers/cloud computers, other devices in the smart home environment, etc.) is abstracted to the lowest common denominator of capabilities of available devices within its category. In some implementations, a fully capable device interface is presented by the hub 180 (or remote servers/cloud computers, other devices in the smart home environment, etc.) and, in some implementations, reflected in a user interface of a user controller electronic device 166 (FIG. 1) regardless of its actual capability.

On devices where a particular advanced capability exists (e.g., scheduling a thermostat for different times and days of the week), respective advances commands are sent directly to the device. In other cases in which devices do not have the particular advanced capability by default, however, a hub (or remote servers/cloud computers, other devices in the smart home environment, etc.) provides extra logic to perform and emulate the same task. As described below, this is accomplished through device configurations that include fully emulated functionality, but which can be overridden to call the device directly when it supports the capability. For example, as shown in FIG. 6, memory 606 of hub device 180 includes several modules for emulating advanced functionality (e.g., high-level sensor feature module 626 and its sub-modules, which in some implementations work in combination with other modules of memory 606, such as hub communication module 618 and/or radio communication module 619, to send commands to connected devices). Similarly, the server system shown in FIG. 7 also includes analogous modules for emulating advanced functionality (e.g., high-level device feature module 7262, FIG. 7). As many device manufacturers include various pieces of advanced capabilities in their devices as differentiators from their competition, the solution described below makes such differentiators moot, since most devices can be operated under control of the hub 180 (or remote servers/cloud computers, other devices in the smart home environment, etc.) in a similar fashion. Examples are provided below.

In one example, thermostats with no scheduling capabilities are provided by the hub 180 (or remote servers/cloud computers, other devices in the smart home environment, etc.) with the ability to run on a schedule. As described above, in some implementations the hub (or remote servers/cloud computers, other devices in the smart home environment, etc.) intercepts an advanced command from a user device (e.g., electronic device 166, FIG. 1). Here, for example, the advanced command includes setting a schedule for a thermostat, such as instructions for turning the air conditioner on during weekdays only. Because the advanced command is intended for a less sophisticated device (e.g., a thermostat without scheduling capabilities, but which includes the basic functionality of adjusting temperature controls), the hub (or remote servers/cloud computers, other devices in the smart home environment, etc.) emulates the advanced functionality by translating the advanced command into a series of basic commands for adjusting the thermostat, but doing so in accordance with a schedule (where the schedule is stored and maintained in the hub, remote servers/cloud computers, or other devices in the smart home environment). Thus, in this example, the hub (or remote servers/cloud computers, other devices in the smart home environment, etc.) maintains the schedule determined by the advanced command, and sends commands for turning the thermostat on or off on the appropriate days. In effect, the hub (or remote servers/cloud computers, other devices in the smart home environment, etc.) therefore emulates the advanced functionality of the advanced command by utilizing logic for parsing the advanced command, and sending a series of basic instructions to the less sophisticated thermostat device. This example is described in detail with respect to the method 1000-A in FIGS. 10A-10B.

In another example, certain dimmer switches have an advanced functionality for continuously brightening/diming a light source, useful, for example, when a holding a button on a remote. For dimmers without this capability, the hub (or remote servers/cloud computers, other devices in the smart home environment, etc.) implements a timer to manually increment the dim value over time to emulate the advanced functionality. This example is described in detail with respect to the method 1000-B in FIG. 10C.

Example logic for implementing such functionality of advanced dimmers is provided below. In this example, the advanced capability as implemented in the hub 180 (or remote servers/cloud computers, other devices in the smart home environment, etc.) commands a light source to continuously brighten until it receives a command to stop (e.g., to be used while a user holds a "brighten" button on a remote). The top trait/interface describes the device methods which must be defined by the physical device mappings (note here that only setLevel must be implemented). It includes full implementations of the adjust capability. Also shown are two physical implementations: the first for a capable device which maps the complex capability to the physical devices capability, and the second for physically implementing setLevel and using the internal implementation to create the same capability.

Example code (e.g., representing source code for a main processor on the hub (e.g., CPU(s) 602 of hub device 180) and written in Scala programming language):

```
// Device level
trait Dimmer extends Outlet {
    // All implementations must implement setLevel, as well as setOn and getOn from Outlet
    def setLevel(level: Double)
    // Default implementation of startAdjustLevel, if device doesn't support def startAdjustLevel(up: Boolean, timeToFull: Int = 0) {
        if (adjustLevelTimer == null) {
            val finalTimeToFull = if (timeToFull == 0)
            adjustTotalTime else timeToFull
            // Use a timer to periodically adjust the level of the device
            until stop is called adjustLevelTimer =
            Timer.scheduleValueAdjustByTime(getLevel( ),
            1.0, 0.0, up, finalTimeToFull, incrementValueTime,
            ( ) => setLevel(value))
        }
    }
    // Default implementation of stopAdjustLevel, if device doesn't
    support def stopAdjustLevel( ) {
        if (adjustLevelTimer != null) {
            adjustLevelTimer.cancel( )
            adjustLevelTimer = null
        }
    }
}
// This particular physical device has continuous adjustment capabilities
class CapableDimmer extends Outlet with Dimmer {
    override def setLevel(level: Double) {
        queueMessage(command, 0x21, doubleToByte(level))
    }
    // Map directly to this device's startAdjustLevel
    override def startAdjustLevel(up: Boolean, timeToFull: Int = 0} {
        queueMessage(command, 0x17, if (up) 0x01 else 0x00)
    }
    // Map directly to this device's stopAdjustLevel
    override def stopAdjustLevel(command: DeviceCommand) {
        queueMessage(command, 0x18, 0x00)
    }
}
// This physical device only has setLevel, so the advanced capabilities are
emulated class BasicDimmer extends Outlet with Dimmer {
    override def setLevel(level: Double) {
        queueMessage(command, 0x21, doubleToByte(level))
    }
}
```

In yet another example, location and time information are used to calculate day/night hours and enable lights to run only during nighttime hours. More specifically, location and time are obtained by the hub (e.g., sunrise/sunset dependent device control module 6264, FIG. 6) (or remote servers/cloud computers, other devices in the smart home environment, etc.), which the hub then uses to calculate corresponding day/night hours. The hub (or remote servers/cloud computers, other devices in the smart home environment, etc.) then sends commands according to the calculations such that a light device (e.g., connected to smart wall plug 110) is run only during night time hours, thereby achieving advanced functionality that the light device does not otherwise have. This example is described in detail with respect to the method 1000-A in FIGS. 10A-10B.

For virtual devices composed of multiple simple devices, a device type profile contains minimum functionalities required of the various simple devices. If the minimum requirements are met, a composite virtual device emulates the functionality of the complex device using the various simple capabilities. One example includes using a relay switch and an open/close sensor to emulate a garage door opener. In particular, a garage door minimally requires: (i) a mechanism to determine the current position of the door (e.g., mechanism for determining whether the door closed) and (ii) a temporary contact relay to activate the door. Thus, if the user positions a sensor detecting the closed position of the door, and a smart relay connected to the manual button of the garage door opener, the devices could be operated remotely and show the door's current position, allowing a user to open or close it. Failures to close or open can similarly be reported.

Other example includes a simple pushbutton, camera, and a music system combined to create a whole-house doorbell. Here, the music system is not purposed solely to the doorbell setup. This example is described in detail with respect to the method 1000-F in Figure H.

As another example, a user mounts a simple thermostat conveniently in a hallway, but also wants to use the temperature from a different room to run it. By using the techniques discussed above, a temperature sensor may be used in the room with the desired temperature, while still allowing the thermostat unit to be positioned in the hallway as desired. This example is described in detail with respect to the method 1000-D in FIG. 10F.

Figure 9A:
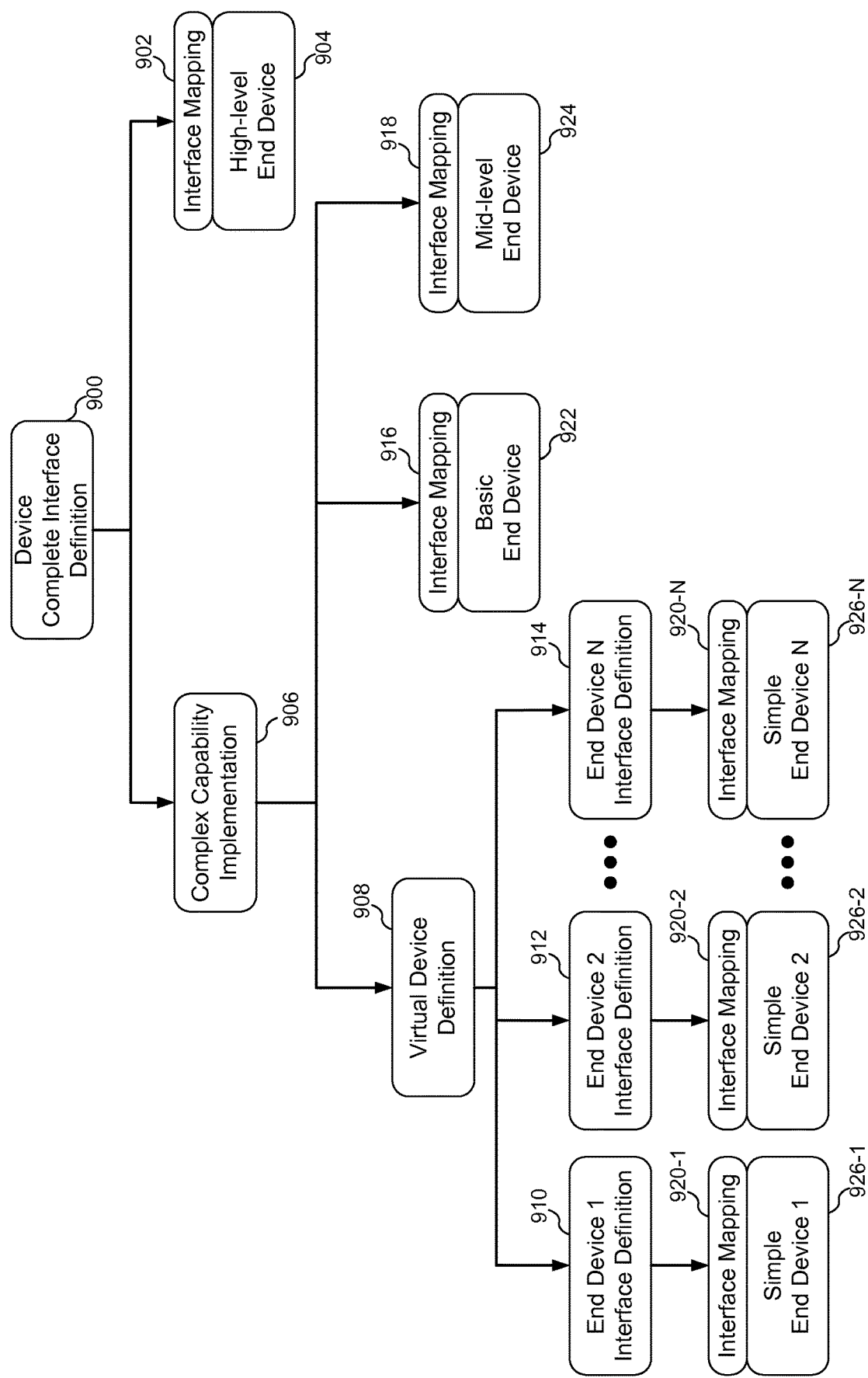
FIG. 9A is a flow diagram of a virtual device system in accordance with some implementations.

FIG. 9A is a flow diagram of a virtual device system in accordance with some implementations. The virtual device system implementation in FIG. 9A enables advanced functionalities using one or a combination end devices (e.g., simple end devices 926-1, 926-2, . . . 926-N, basic end device 922, mid-level end device 924, high-level end device 904, etc.) having varying degrees of capabilities and functionalities.

At the top, a device interface 900 ("Device Complete Interface Definition") contains the complete fully functional interface definition of a particular device type (e.g., garage door system, thermostat, light system, etc.) (e.g., stored and managed by high-level device feature module 626 or a sub-module thereof, FIG. 6). If a fully high-level end device 904 is added, it implements a thin interface 902 mapping all of the complete capabilities from the device interface 900 to the physical high-level end device 904 (e.g., garage door system that tracks progress of open/close door operation, thermostat with advanced scheduling capabilities, a light dimmer, etc.). If a less capable, basic device 922 is added, an implementation of the complex capabilities (e.g., implemented interface 906) mapped to simpler capabilities is inserted below the device interface 900, and the basic device 922 is mapped to device interface 900 instead using a thin interface 916 (e.g., a basic thermostat with temperature setting controls, light having an on/off switch, etc.). A device with some complex capabilities (e.g., mid-level end device 924) can selectively implement interfaces of both the top level interface definition (e.g., device interface 900) and the implemented interface 906 using a thin interface 918 (e.g., thermostat with some scheduling capabilities, such as setting schedule on a daily, but not hourly, schedule). Finally, if simple components are combined to create this functionality, an additional virtual device layer 908 ("Virtual Device Definition") is added below the implemented interface 906 to map functions to the various independent components. Multiple device layers 920-1, 920-2, . . . 920-N can be added for corresponding simple end devices 926-1, 926-2, . . . 926-N using respective thin interfaces 920-1, 920-2, . . . 920-N for the end devices. Programmatically, this is realized through an object oriented hierarchy using inheritance and traits/mix-ins. The end result is that all of these variously capable device configurations operate identically and in a fully functional way as accessed through the top level interface definition. Examples of simple end devices, their functionalities, and how they can be combined to create an advanced functionality are described above and with respect to FIGS. 10A-10H and 11.

Figure 9B:
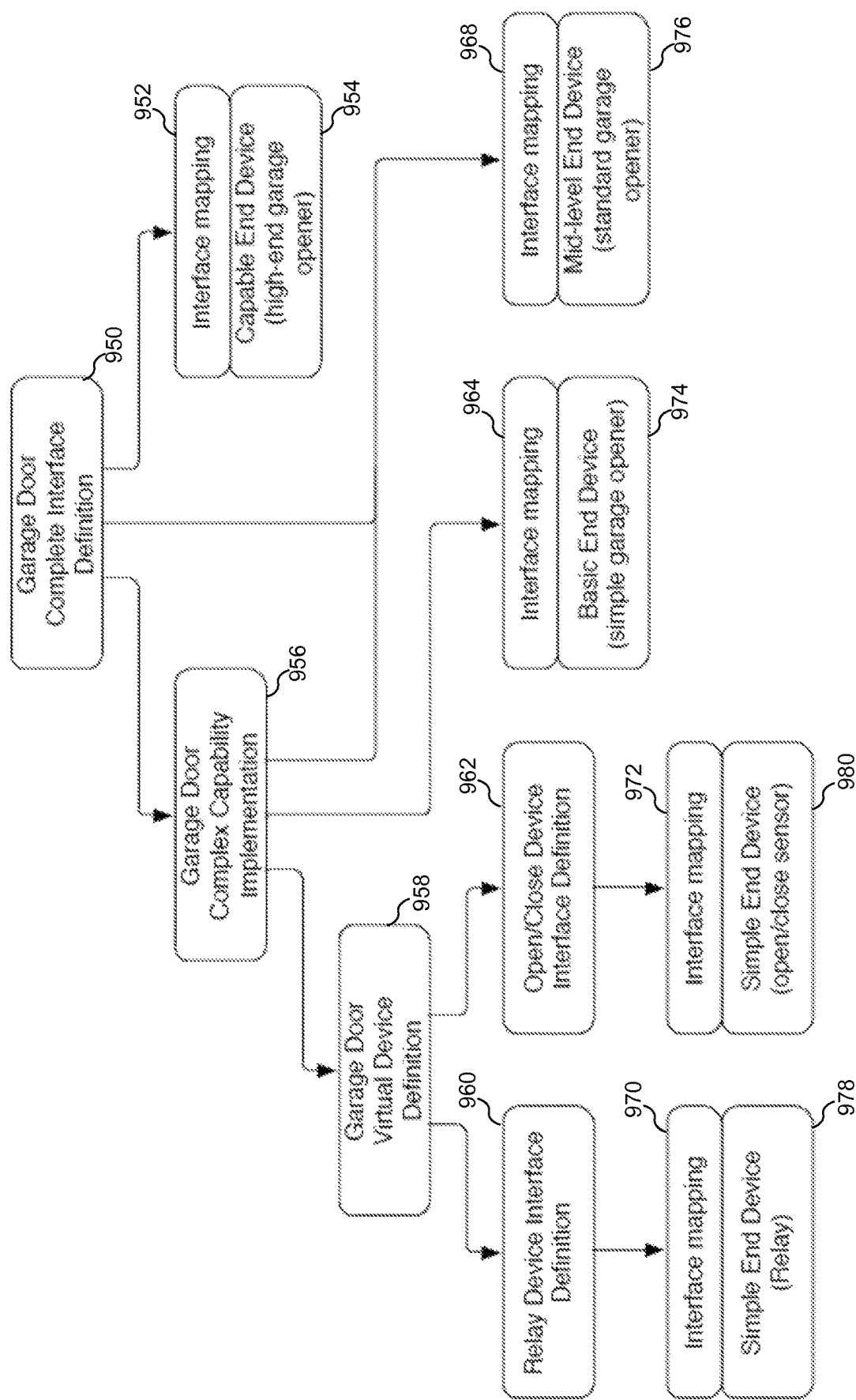
FIG. 9B is a flow diagram of a virtual device system for a garage door system in accordance with some implementations.

FIG. 9B is a flow diagram of a virtual device system specifically for a garage door system in accordance with some implementations.

At the top, a device interface 950 ("Garage Door Complete Interface Definition") contains the complete fully functional interface definition of a particular device type (e.g., stored and managed by high-level device feature module 626 or a sub-module thereof, FIG. 6). If a fully capable end device is added, it implements a thin interface 952 mapping all of the complete capabilities from the device interface 950 to the physical capable end device 954 (e.g., a high-end garage door opener system). If a less capable, basic device 974 is added, an implementation of the complex capabilities (e.g., implemented interface 956) mapped to simpler capabilities is inserted below the device interface 950, and the basic device 974 is mapped to device interface 950 instead using a thin interface 964. A device with some complex capabilities (e.g., mid-level end device 976) can selectively implement interfaces of both the top level interface definition (e.g., device interface 950) and the implemented interface 956 using a thin interface 968. Finally, if simple components are combined to create this functionality, an additional virtual device layer 958 ("Garage Door Virtual Device Definition") is added below the implemented interface 956 to map functions to the various independent components. In this example, a device layer 960 for a relay (e.g., "Relay Device Interface Definition" for simple end device 978) maps functions to the relay using a thin interface 970, while a device layer 962 for an open/close sensor (e.g., "Open/Close Device Interface Definition" for simple end device 980) maps functions to the open/close sensor using a thin interface 972. This example is described in detail with respect to the method 1000-C in FIGS. 10D-10E.

FIGS. 10A-10H are flow diagrams illustrating methods 1000-A through 1000-F for emulating advanced functionality on devices, in accordance with some implementations. The various implementations of the methods 1000-A through 1000-F correspond to the various techniques for enabling high-level features to devices with lower levels of functionality described above. In some implementations, the methods are performed by one or more electronic devices of one or more systems (e.g., devices of a smart home environment 100, FIG. 1; smart devices 204 and/or hub device 180 of smart home network 202, FIG. 2; client devices 504, FIG. 5; etc.), a server system (e.g., smart home provider server system 164 of FIGS. 1 and 2, hub server system 508 of FIG. 5), or any combination thereof. Thus, in some implementations, the operations of the methods described herein are entirely interchangeable, and respective operations of the method are performed by any of the aforementioned devices, systems, or combination of devices and/or systems. For ease of reference, the methods herein will be described as being performed by a first device (e.g., a hub device 180, FIG. 2). FIGS. 10A-10H correspond to instructions stored in a computer memory or other computer-readable storage medium (e.g., memory 606 of the hub device 180).

Figure 10A:
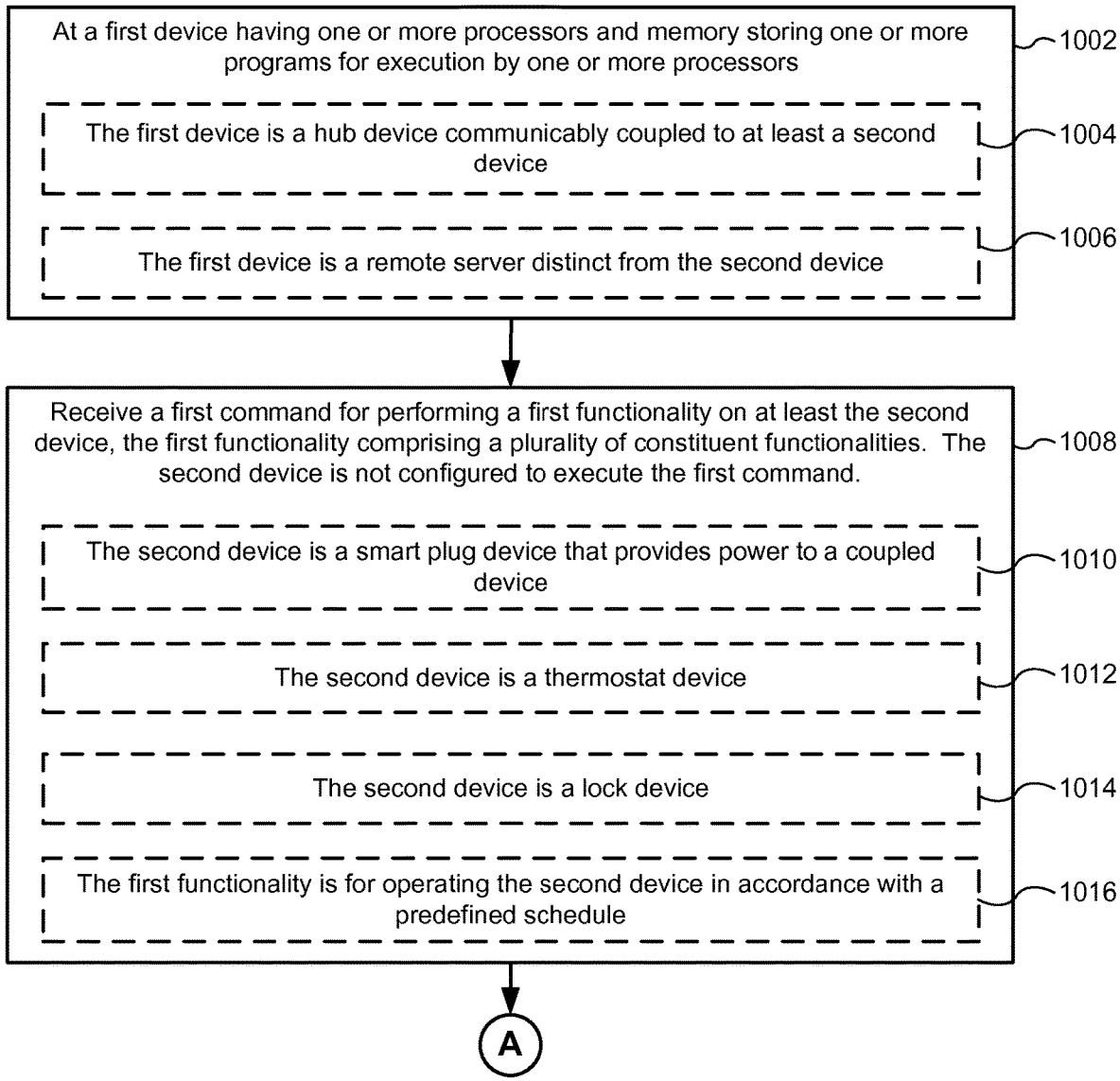
FIGS. 10A-10H are flow diagrams illustrating methods for emulating advanced functionality on devices in accordance with some implementations.

Referring to FIG. 10A, with respect to the method 1000-A, the first device includes (1002) one or more processors and memory storing one or more programs for execution by one or more processors. In some implementations, the first device is (1004) a hub device (e.g., hub device 180) communicably coupled to at least a second device (e.g., thermostat 102, FIG. 1). In some implementations, the first device is (1006) a remote server (e.g., smart home provider server system 164) distinct from the second device.

The first device receives (1008) (e.g., from a client device displaying a user interface for controlling smart devices in a smart home environment) a first command for performing a first functionality on at least the second device, the first functionality comprising a plurality of constituent functionalities. The second device is not configured to execute the first command. For example, the first functionality is an advanced feature for scheduling operation of a thermostat for different times and days of the week, the second device being a basic thermostat that does not provide the advanced scheduling functionality and can only perform basic temperature setting capabilities. Different functionalities and the devices on which such functionalities are emulated are described in greater detail below.

In some implementations, the second device is (1010) a smart plug device (e.g., smart wall plug 110) that provides power to a coupled device. In some implementations, the second device is (1012) a thermostat device (e.g., thermostat 102). In some implementations, the second device is (1014) a lock device (e.g., a smart doorlock).

In some implementations, the first functionality is (1016) for operating the second device in accordance with a predefined schedule (e.g., scheduling operation of a thermostat for different times and days of the week). In some implementations, the predefined schedule is specified with respect to days of the week. Additionally and/or alternatively, the predefined schedule is specified with respect to hours for each day of the week. In some implementations, the first functionality is for operating the second device in accordance with detection of a sunrise or sunset condition in a local area in which the second device is situated (e.g., closing a smart curtain in response to detecting the sun setting).

Figure 10B:
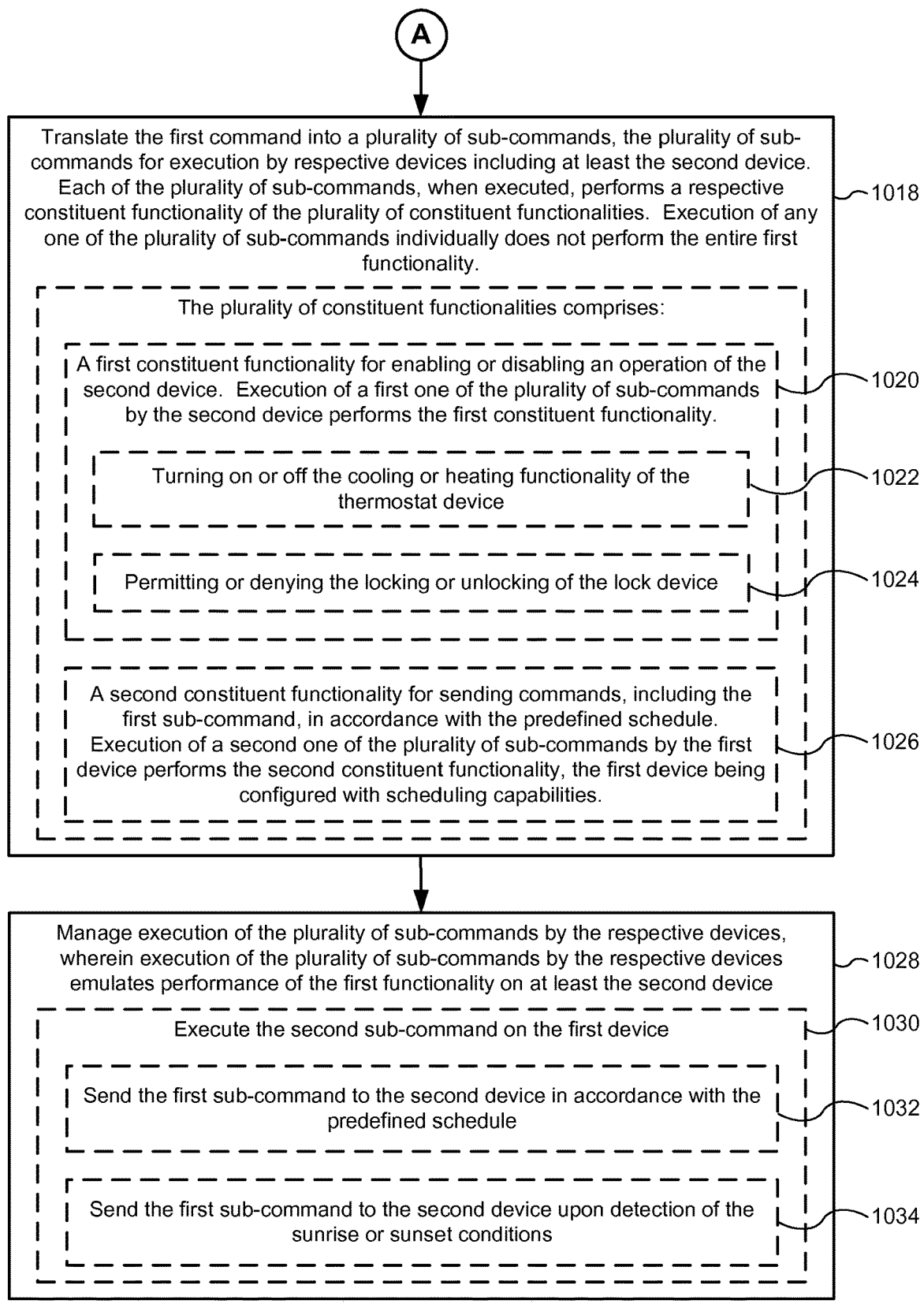

Referring now to FIG. 10B, the first device translates (1018) the first command into a plurality of sub-commands, the plurality of sub-commands for execution by respective devices including at least the second device. Each of the plurality of sub-commands, when executed, performs a respective constituent functionality of the plurality of constituent functionalities. Execution of any one of the plurality of sub-commands individually does not perform the entire first functionality.

In some implementations, the plurality of constituent functionalities for the first functionality includes (1020) a first constituent functionality for enabling or disabling an operation of the second device. Execution of a first one of the plurality of sub-commands by the second device performs the first constituent functionality. For example, in some implementations, enabling or disabling the operation includes (1022) turning on or off the cooling or heating functionality of the thermostat device. Furthermore, in some implementations, enabling or disabling the operation includes (1024) permitting or denying the locking or unlocking of the lock device. In some implementations, the first sub-command, when executed, causes the lock device to replace an existing list of valid access codes with a new list of valid access codes.

In some implementations, the plurality of constituent functionalities includes (1026) a second constituent functionality for sending commands, including the first sub-command, in accordance with the predefined schedule. Execution of a second one of the plurality of sub-commands by the first device performs the second constituent functionality, the first device being configured with scheduling capabilities. For example, execution of the second sub-command results in the first sub-command (e.g., command for turning on/off a cooling functionality of a thermostat device) being sent to a device based on a schedule.

In some implementations, the plurality of constituent functionalities further includes a third constituent functionality for detecting the sunrise or sunset conditions, wherein execution of a third one of the plurality of sub-commands performs the third constituent functionality. Furthermore, in some implementations, the second constituent functionality is for sending the commands, including the first sub-command, in accordance with detection of the sunrise or sunset conditions.

The first device manages (1028) execution of the plurality of sub-commands by the respective devices, wherein execution of the plurality of sub-commands by the respective devices emulates performance of the first functionality on at least the second device. In some implementations, managing execution includes (1030) executing the second sub-command on the first device, including (1032) sending the first sub-command to the second device in accordance with the predefined schedule. Referring to the example above, if a first device is a hub device that includes scheduling capabilities (e.g., sending commands based on a predefined schedule), execution of the second sub-command by the hub device results in the first sub-command (e.g., command for turning on/off a cooling functionality of a thermostat device) being sent to a thermostat device in accordance with a schedule. Thus, while the thermostat device in this example does not itself have scheduling functionalities built-in, managing execution of the first and second sub-commands effectively emulates such functionality on the thermostat device. In some implementations, executing the second sub-command further includes (1034) sending the first sub-command to the second device upon detection of the sunrise or sunset conditions (e.g., sending a command to a smart device to automatically close window blinds at sunset).

Figure 10C:
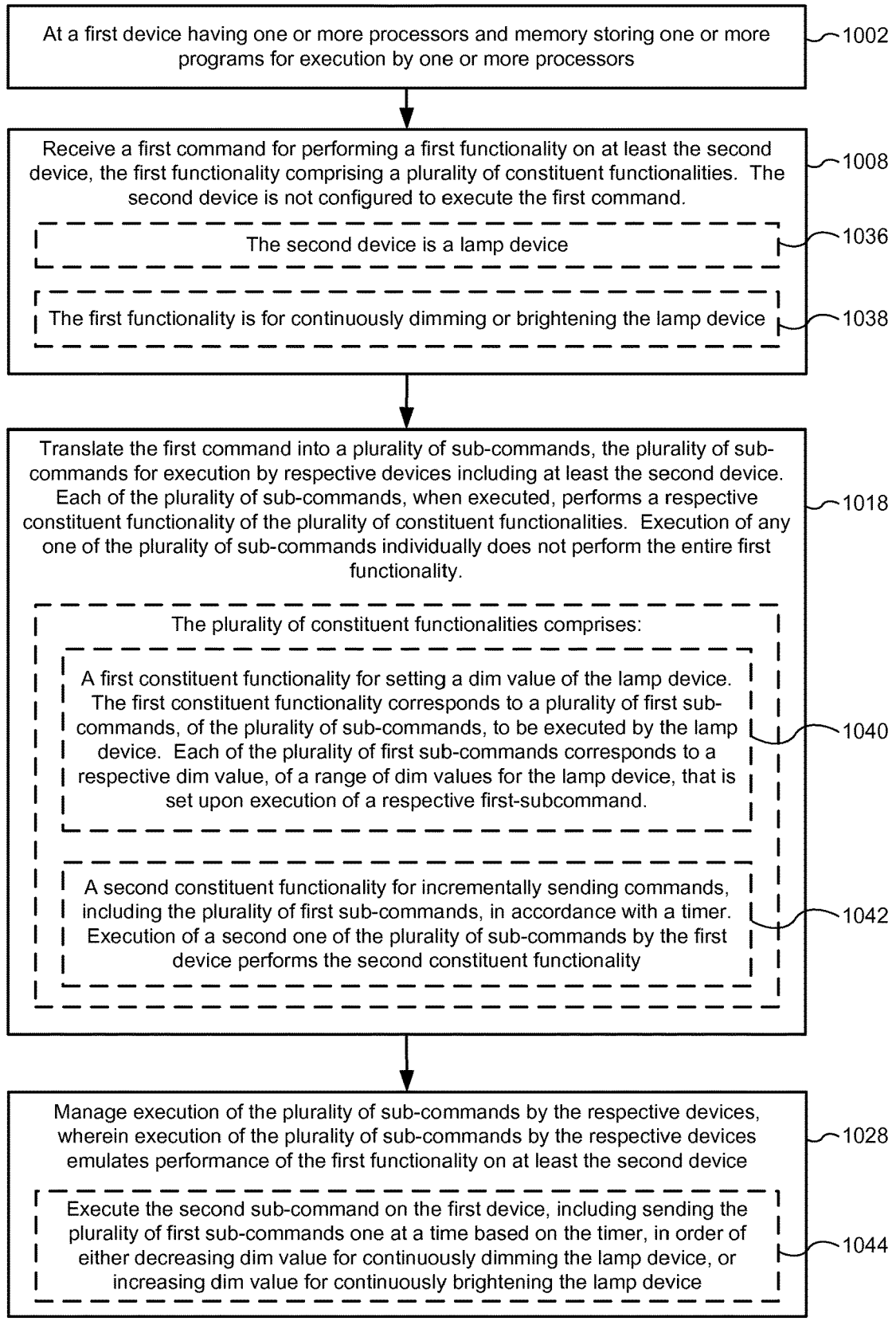

Referring to FIG. 10C, with respect to the method 1000-B, the first device receives (1008) a first command, translates (1018) the first command into a plurality of sub-commands, and manages (1028) execution of the plurality of sub-commands by the respective devices, in accordance with any of the implementations described with respect the methods 1000-A through 1000-F in FIGS. 10A-10H.

In some implementations, the second device is (1036) a lamp device. Furthermore, in some implementations, the first functionality is (1038) for continuously dimming or brightening the lamp device.

In some implementations, the plurality of constituent functionalities includes (1040) a first constituent functionality for setting a dim value of the lamp device. The first constituent functionality corresponds to a plurality of first sub-commands, of the plurality of sub-commands, to be executed by the lamp device. Each of the plurality of first sub-commands corresponds to a respective dim value, of a range of dim values for the lamp device, that is set upon execution of a respective first-subcommand. For example, each of the first sub-commands corresponds to a different brightness/dim value, and the lamp device is capable of executing the sub-commands (and therefore setting a brightness or dim value) one at a time.

In some implementations, the plurality of constituent functionalities includes (1042) a second constituent functionality for incrementally sending commands, including the plurality of first sub-commands, in accordance with a timer. Execution of a second one of the plurality of sub-commands by the first device performs the second constituent functionality. For example, execution of the second sub-command results in the plurality of first sub-command (e.g., commands for setting a lamp device at different specified dim values) being sent to a device based on a timer (e.g., a different first sub-command being sent every 0.2 ms).

In some implementations, managing (step 1028) execution of the plurality of sub-commands by the respective devices includes (1044) executing the second sub-command on the first device, which includes sending the plurality of first sub-commands one at a time based on the timer, in order of either decreasing dim value for continuously dimming the lamp device, or increasing dim value for continuously brightening the lamp device. Referring to the example above, if a first device is a remote server with timing capabilities (e.g., sending sub-commands at specified intervals of time), execution of the second sub-command by the remote server results in the plurality of first sub-commands (e.g., for setting a lamp device at different specified dim values) being sent to the lamp device either in order of decreasing or increasing dim value to emulate the functionality of a light dimmer. Thus, while the lamp device in this example does not itself have dimming capabilities built-in, managing execution of the plurality of first sub-commands and the second sub-command effectively emulates such functionality on the lamp device.

Figure 10D:
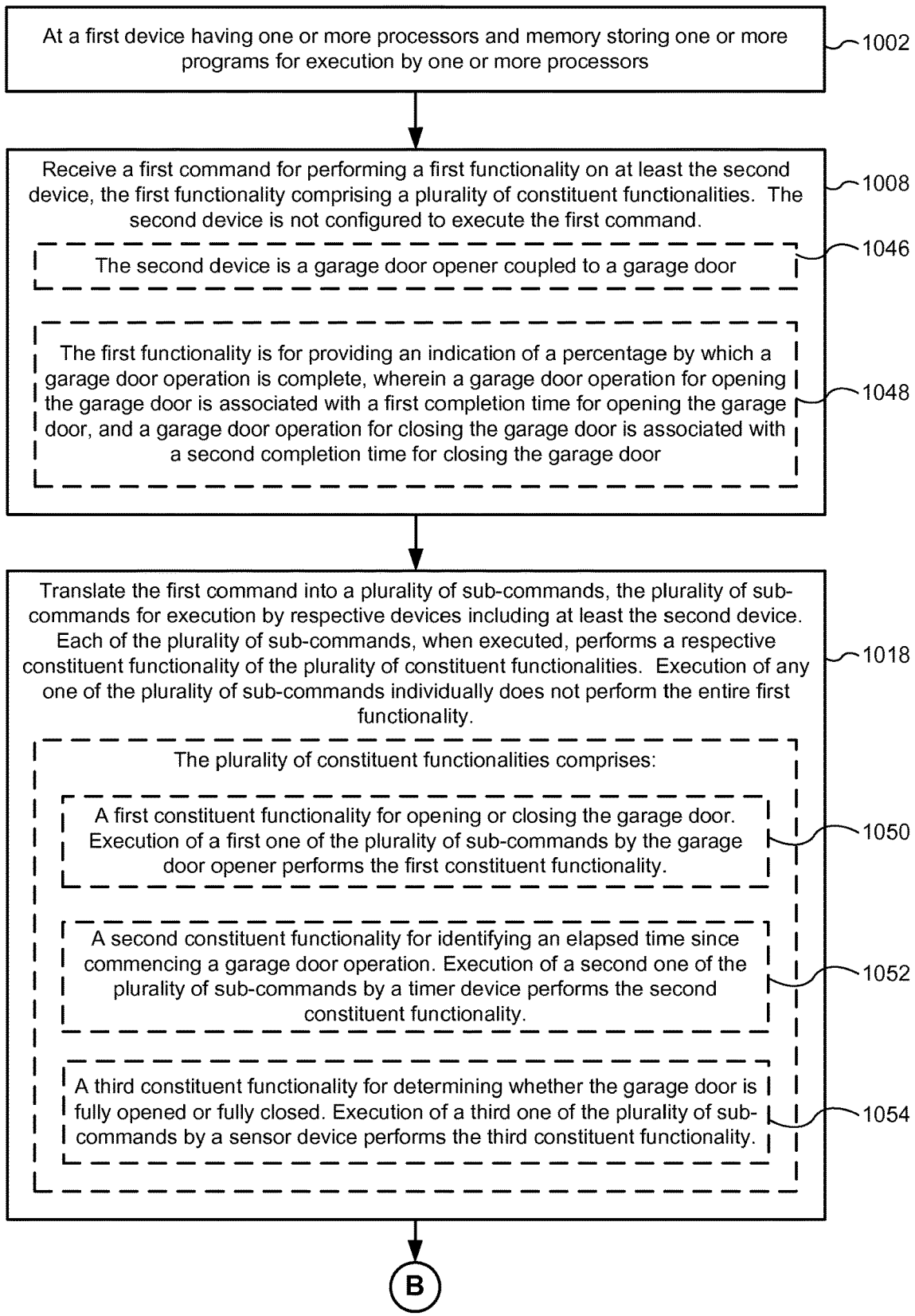
Figure 10E:
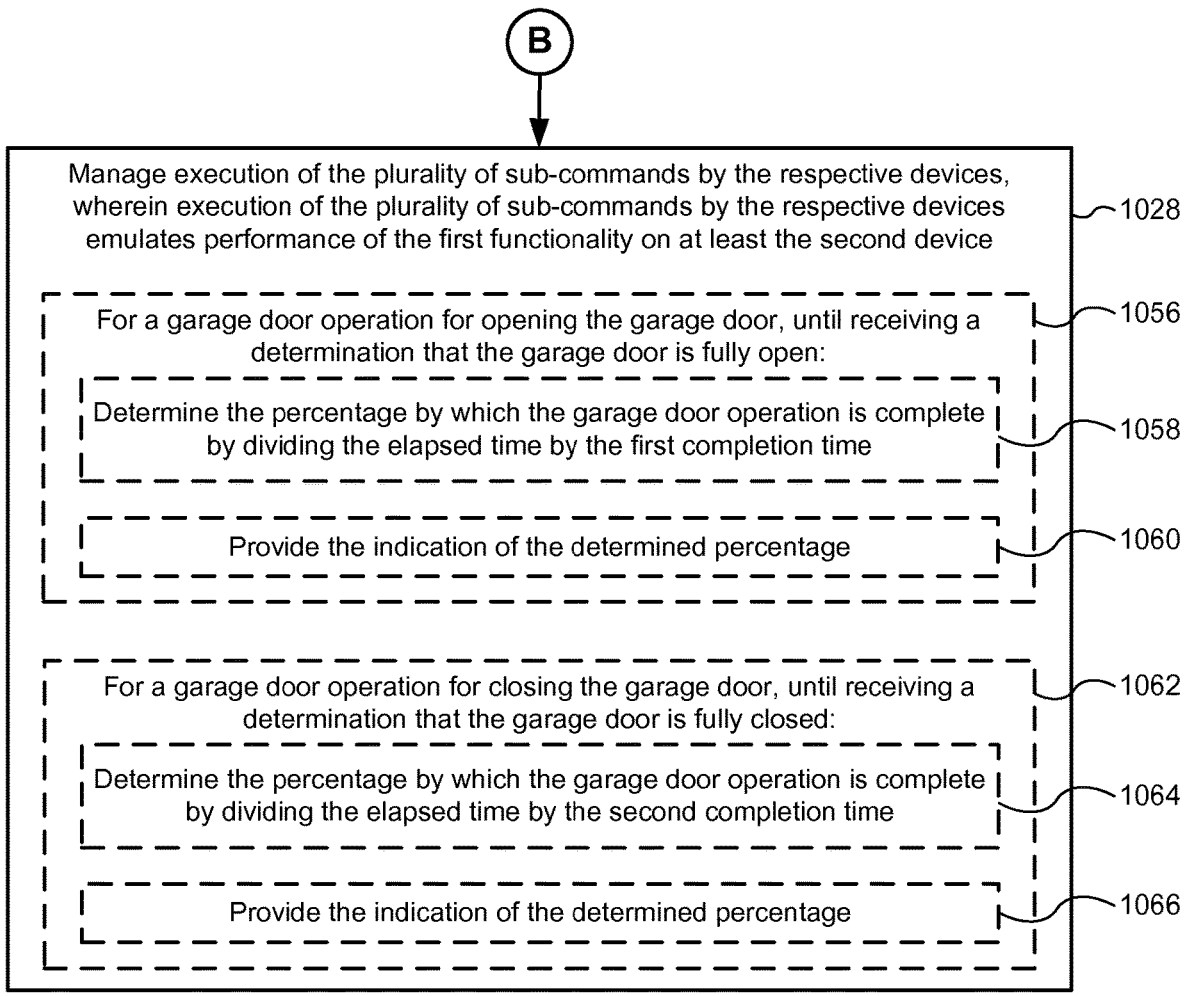

Referring to FIG. 10D, with respect to the method 1000-C, the first device receives (1008) a first command, translates (1018) the first command into a plurality of sub-commands, and manages (1028) execution of the plurality of sub-commands by the respective devices, in accordance with any of the implementations described with respect the methods 1000-A through 1000-F in FIGS. 10A-10H.

In some implementations, the second device is (1046) a garage door opener coupled to a garage door. Furthermore, in some implementations, the first functionality is (1048) for providing an indication of a percentage by which a garage door operation is complete (e.g., displaying a progress indicator on a client device user interface), wherein a garage door operation for opening the garage door is associated with a first completion time for opening the garage door, and a garage door operation for closing the garage door is associated with a second completion time for closing the garage door.

In some implementations, the plurality of constituent functionalities includes (1050) a first constituent functionality for opening or closing the garage door. Execution of a first one of the plurality of sub-commands by the garage door opener performs the first constituent functionality. For example, execution of the first sub-command by the garage door opener (e.g., a motor) results in the coupled garage door to either physically open or close.

In some implementations, the plurality of constituent functionalities includes (1052) a second constituent functionality for identifying an elapsed time since commencing a garage door operation. Execution of a second one of the plurality of sub-commands by a timer device (e.g., a component or module of a hub device 180) performs the second constituent functionality. For example, execution of the second sub-command by the timer device causes the timer device to output (e.g., and send back to the device that transmitted the second sub-command to the timer device) a reading that indicates an elapsed time since beginning a current garage door operation.

In some implementations, the plurality of constituent functionalities includes (1054) a third constituent functionality for determining whether the garage door is fully opened or fully closed. Execution of a third one of the plurality of sub-commands by a sensor device (e.g., separate from the garage door opener and positioned in line-of-sight of the garage door) performs the third constituent functionality. For example, execution of the third sub-command by the sensor device causes the sensor to output (e.g., and send back to the device that transmitted the third sub-command to the sensor device) a reading that indicates whether the garage door is partially/fully open or closed.

In some implementations, managing (step 1028) execution of the plurality of sub-commands by the respective devices includes, for a garage door operation for opening the garage door, and until receiving a determination that the garage door is fully open (1056): determining (1058) the percentage by which the garage door operation is complete by dividing the elapsed time by the first completion time; and providing (1060) the indication of the determined percentage. For example, the first sub-command for opening a garage door is first sent to the garage door opener. Once the garage door open operation commences, the elapsed time is obtained by continuously sending (e.g., at predefined intervals) the second sub-command to the timer device thereafter until the garage door is fully opened, which is determined by continuously sending (e.g., at predefined intervals) the third sub-command to the sensor device until an indication that the garage door is fully open is returned. Until the garage door is fully opened, the elapsed time readings obtained from the timer device are used in conjunction with the first completion time (e.g., for opening the garage door) to determine the percentage by which a garage door operation is complete.

In some implementations, managing (step 1028) execution of the plurality of sub-commands by the respective devices includes, for a garage door operation for closing the garage door, and until receiving a determination that the garage door is fully closed (1062): determining (1064) the percentage by which the garage door operation is complete by dividing the elapsed time by the second completion time; and providing (1066) the indication of the determined percentage. For example, the first sub-command for closing a garage door is first sent to the garage door opener. Once the garage door closing operation commences, the elapsed time is obtained by continuously sending (e.g., at predefined intervals) the second sub-command to the timer device thereafter until the garage door is fully closed, which is determined by continuously sending (e.g., at predefined intervals) the third sub-command to the sensor device until an indication that the garage door is fully open is returned. Until the garage door is fully opened, the elapsed time readings obtained from the timer device is used in conjunction with the second completion time (e.g., for closing the garage door) to determine the percentage by which a garage door operation is complete. Thus, while none of the devices in this example are individually capable of determining a real-time progress of a garage door operation, managing execution of the sub-commands across the respective devices effectively emulates such functionality.

Figure 10F:
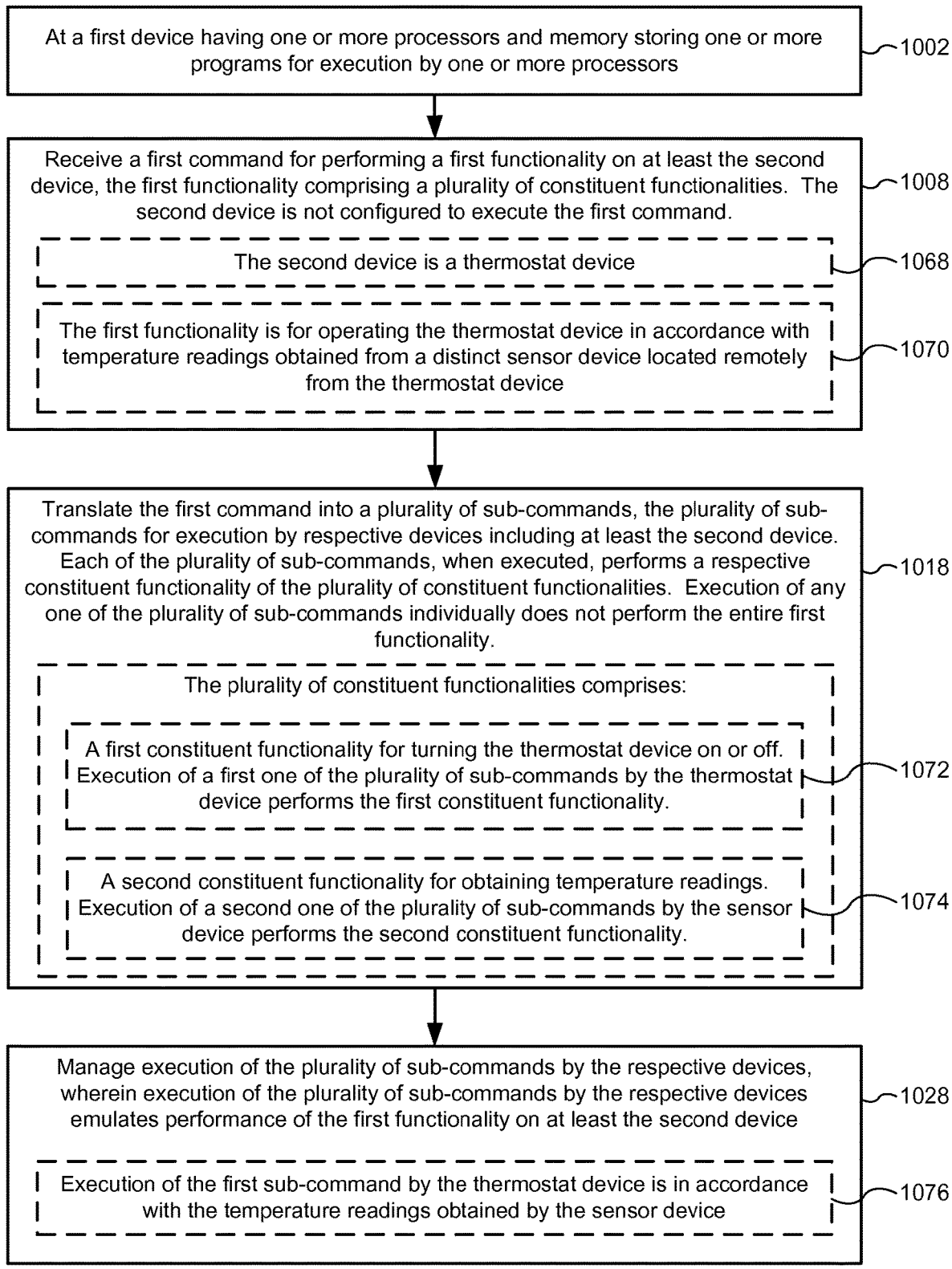

Referring to FIG. 10F, with respect to the method 1000-D, the first device receives (1008) a first command, translates (1018) the first command into a plurality of sub-commands, and manages (1028) execution of the plurality of sub-commands by the respective devices, in accordance with any of the implementations described with respect the methods 1000-A through 1000-F in FIGS. 10A-10H.

In some implementations, the second device is (1068) a thermostat device. Furthermore, in some implementations, the first functionality is (1070) for operating the thermostat device in accordance with temperature readings obtained from a distinct sensor device located remotely from the thermostat device. For example, the distinct sensor device may be a device equipped with temperature sensors (e.g., a hazard detector 104) that is located in a different room from the thermostat.

In some implementations, the plurality of constituent functionalities includes (1072) a first constituent functionality for turning the thermostat device on or off (e.g., command for turning on/off a cooling/heating functionality of a thermostat device). Execution of a first one of the plurality of sub-commands by the thermostat device performs the first constituent functionality.

In some implementations, the plurality of constituent functionalities includes (1074) a second constituent functionality for obtaining temperature readings. Execution of a second one of the plurality of sub-commands by the sensor device (e.g., hazard detector 104) performs the second constituent functionality.

In some implementations, managing (step 1028) execution of the plurality of sub-commands by the respective devices includes (1076) the execution of the first sub-command by the thermostat device in accordance with the temperature readings obtained by the sensor device. For example, execution of the second sub-command by the sensor device causes the sensor to output (e.g., and send back to the device that transmitted the second sub-command to the sensor device) a temperature reading of the room in which the sensor device is located. This temperature reading obtained from the sensor device is then used by the thermostat device in performing its basic operations of turning on/off its cooling or heating functionality. Advantageously, a temperature sensor may be used in a room with the desired temperature, while allowing a thermostat unit to be positioned in a different room as desired.

Figure 10G:
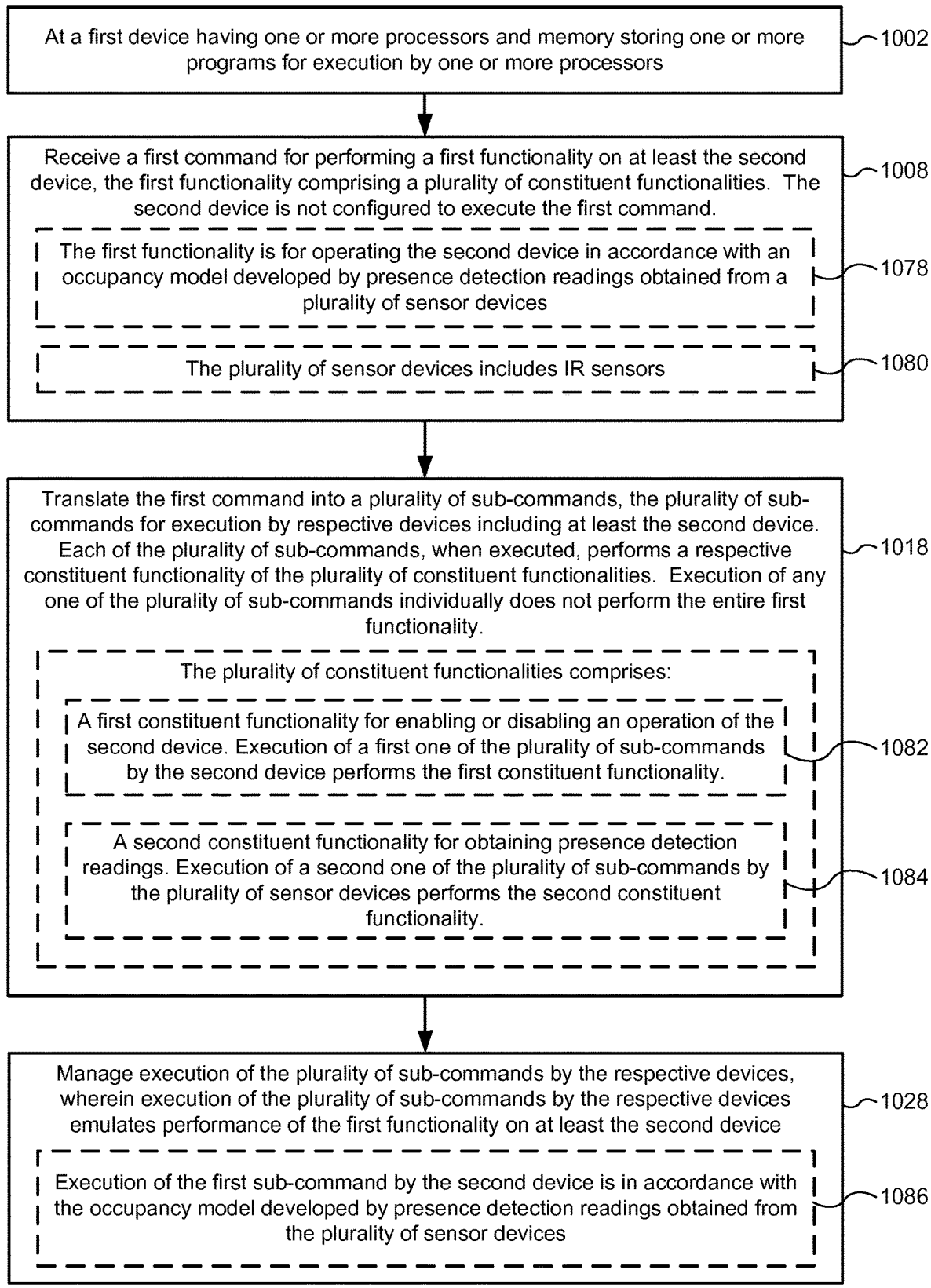

Referring to FIG. 10G, with respect to the method 1000-E, the first device receives (1008) a first command, translates (1018) the first command into a plurality of sub-commands, and manages (1028) execution of the plurality of sub-commands by the respective devices, in accordance with any of the implementations described with respect the methods 1000-A through 1000-F in FIGS. 10A-10H.

In some implementations, the first functionality is (1078) for operating the second device (e.g., a thermostat) in accordance with an occupancy model developed by presence detection readings obtained from a plurality of sensor devices. As described with respect to FIG. 1, devices may be used to determine occupancy of the structure 150 and/or particular rooms 152 in the structure 150, where the smart home environment 100 may additionally or alternatively include one or more occupancy sensors (e.g., cameras 118, the smart doorbell 106, smart doorlocks, touch screens, IR sensors, microphones, ambient light sensors, motion detectors, smart nightlights 170, etc.). In some implementations, the plurality of sensor devices includes (1080) IR sensors.

In some implementations, the plurality of constituent functionalities includes (1082) a first constituent functionality for enabling or disabling an operation of the second device (e.g., turning device on/off). Execution of a first one of the plurality of sub-commands by the second device performs the first constituent functionality.

In some implementations, the plurality of constituent functionalities includes (1084) a second constituent functionality for obtaining presence detection readings. Execution of a second one of the plurality of sub-commands by the plurality of sensor devices performs the second constituent functionality. For example, execution of the second sub-command by one or more sensor devices causes the devices to output (e.g., and send back to the device that transmitted the second sub-command to the sensor devices) a reading that indicates a current occupancy of a specified area.

In some implementations, managing (step 1028) execution of the plurality of sub-commands by the respective devices includes (1086) execution of the first sub-command by the second device in accordance with the occupancy model developed by presence detection readings obtained from the plurality of sensor devices. In one example, a camera device may be turned on (e.g., by executing the first sub-command) in response to detecting an unexpected occupancy within a household, based on an occupancy model developed by multiple sensor devices within the household that execute the second sub-commands. Thus, although some devices do not have built-in presence sensors and are not operated based on an occupancy they detect, such functionality is emulated by managing execution of the sub-commands across the respective devices.

Figure 10H:
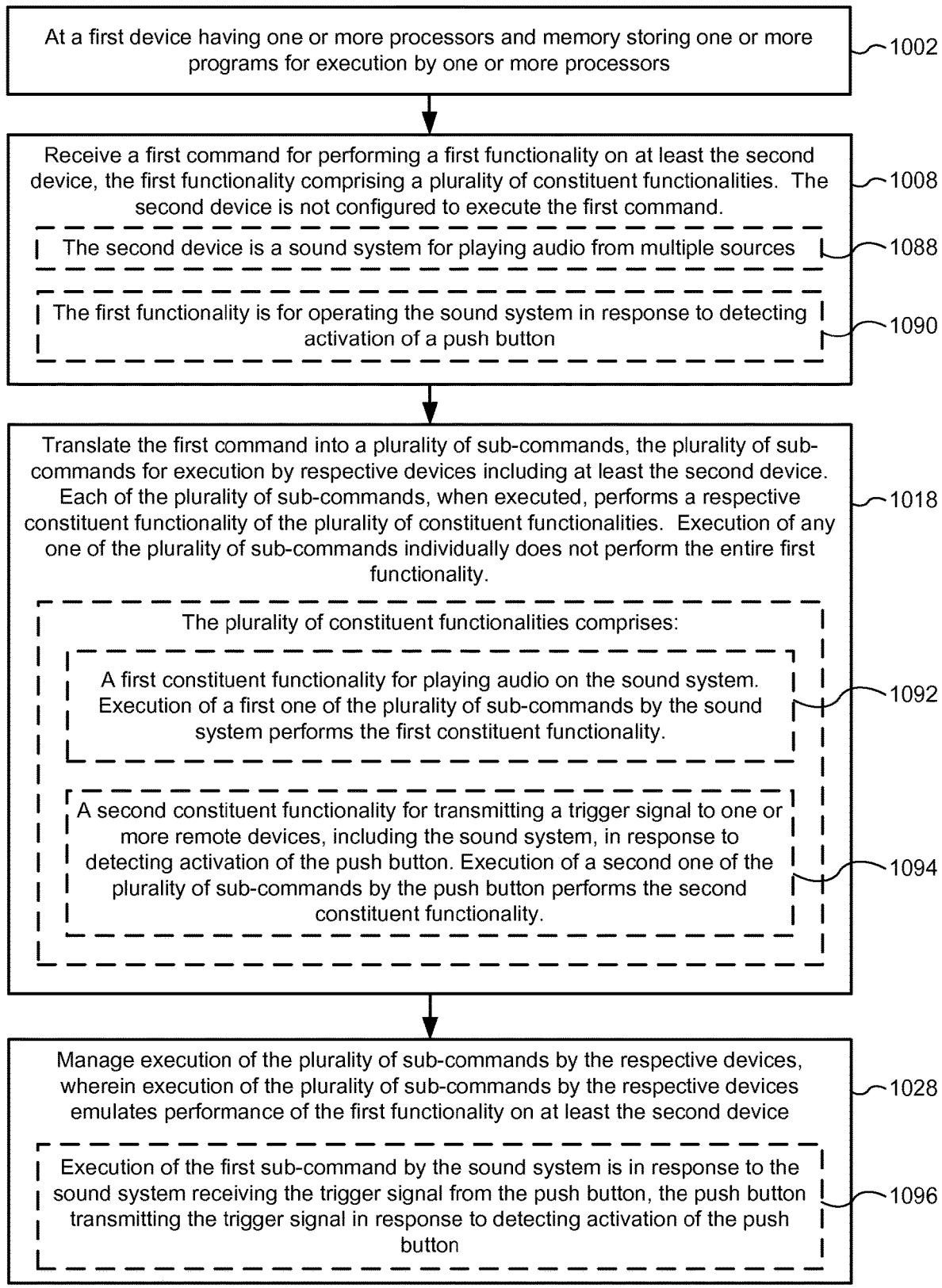

Referring to FIG. 10H, with respect to the method 1000-F, the first device receives (1008) a first command, translates (1018) the first command into a plurality of sub-commands, and manages (1028) execution of the plurality of sub-commands by the respective devices, in accordance with any of the implementations described with respect the methods 1000-A through 1000-F in FIGS. 10A-10H.

In some implementations, the second device is (1088) a sound system for playing audio from multiple sources (e.g., a home theater system). Furthermore, in some implementations, the first functionality is (1090) for operating the sound system in response to detecting activation of a push button. For example, the push button may be a doorbell device (or other electronic device having a button) configured to transmit signals to other devices either wirelessly or using a wired connection. In some implementations, the sound system and the push button are located remotely from each other (e.g., in different regions of a premises). Additionally and/or alternatively, the first functionality is further for operating a camera device in response to detecting activation of the push button (e.g., capture surveillance image in response to detecting a trigger signal from activating the push button).

In some implementations, the plurality of constituent functionalities includes (1092) a first constituent functionality for playing audio (e.g., a sound effect) on the sound system. Execution of a first one of the plurality of sub-commands by the sound system performs the first constituent functionality. In some implementations, the audio played back is stored as a file in the sound system.

In some implementations, the plurality of constituent functionalities includes (1094) a second constituent functionality for transmitting a trigger signal to one or more remote devices, including the sound system, in response to detecting activation of the push button. Execution of a second one of the plurality of sub-commands by the push button performs the second constituent functionality. The trigger signal may be a simple command that causes playback of a pre-configured audio file or sound effect.

In some implementations, the plurality of constituent functionalities includes a third constituent functionality for capturing an image, wherein execution of a third one of the plurality of sub-commands by the camera device performs the third constituent functionality.

In some implementations, managing (step 1028) execution of the plurality of sub-commands by the respective devices includes (1096) execution of the first sub-command by the sound system is in response to the sound system receiving the trigger signal from the push button, the push button transmitting the trigger signal in response to detecting activation of the push button. As an example, if a doorbell button is activated in response to a user pressing the button, a trigger signal is sent (e.g., wirelessly) to a sound system, and the sound system plays audio in response to receiving the trigger signal. In effect, while a doorbell may typically be limited to outputting sound in a particular region (e.g., front region of household), the advanced functionality of using an existing sound system to operate concurrently with a doorbell is emulated by managing execution of the sub-commands across the respective devices. Furthermore, in some implementations, execution of the third sub-command by the camera device is in response to the camera device receiving the trigger signal from the push button, the push button transmitting the trigger signal in response to detecting activation of the push button. Thus, in addition to playing a sound effect on the sound system, the trigger signal is additionally transmitted to a surveillance camera (e.g., positioned at the front door) and causes the camera to capture an image.

Figure 11:
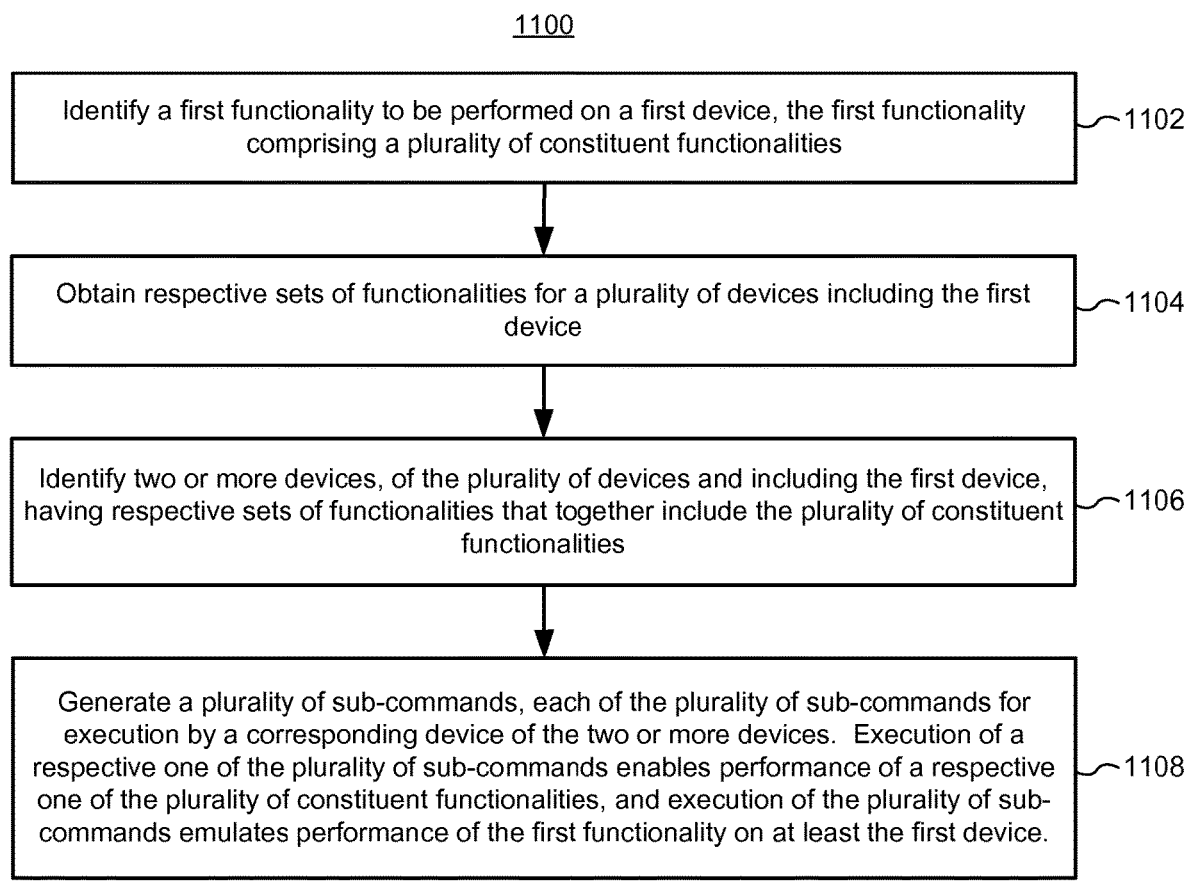
FIG. 11 is a flow diagram illustrating a method for emulating advanced functionality on devices in accordance with some implementations.

FIG. 11 is a flow diagram illustrating a method 1100 for emulating advanced functionality on devices, in accordance with some implementations. The various implementations of the method 1100 correspond to the various techniques for enabling high-level features to devices with lower levels of functionality described above. In some implementations, the method is performed by one or more electronic devices of one or more systems (e.g., devices of a smart home environment 100, FIG. 1; smart devices 204 and/or hub device 180 of smart home network 202, FIG. 2), a server system (e.g., smart home provider server system 164 of FIGS. 1 and 2, hub server system 508 of FIG. 5), or any combination thereof. Thus, in some implementations, the operations of the method 1100 described herein are entirely interchangeable, and respective operations of the method are performed by any of the aforementioned devices, systems, or combination of devices and/or systems. For ease of reference, the methods herein will be described as being performed by a first device (e.g., server system 508, FIG. 7). FIG. 11 corresponds to instructions stored in a computer memory or other computer-readable storage medium (e.g., memory 706 of the server system 508).

The first device identifies (1102) a first functionality to be performed on a first device, the first functionality comprising a plurality of constituent functionalities (various functionalities and respective constituent functionalities are described above with respect to FIGS. 10A-10H).

Furthermore, the first device obtains (1104) respective sets of functionalities for a plurality of devices including the first device. The respective sets of functionalities correspond to various device capabilities, functionalities, and features of a particular device. For example, a thermostat device 102 (FIG. 1) may be equipped with a set of functionalities that includes cooling/heating functionality and presence detection, while a hub device 180 is equipped with scheduling capabilities.

The first device then identifies (1106) two or more devices, of the plurality of devices and including the first device, having respective sets of functionalities that together include the plurality of constituent functionalities. For example, given a first functionality for operating a thermostat in accordance with a predefined schedule, constituent functionalities include functionality for (1) operating a thermostat device (e.g., turning cooling/heating functions on/off), and (2) sending commands to the thermostat device in accordance with a predefined schedule (e.g., during specific hours in a day). Continuing the example above, both the thermostat device (e.g., cooling/heating functionality) and the hub device (e.g., scheduling capabilities) are therefore identified and selected as having sets of functionalities that together include the required constituent functionalities.

After identifying the two or more devices, a plurality of sub-commands is generated (1108), each of the plurality of sub-commands for execution by a corresponding device of the two or more devices. Execution of a respective one of the plurality of sub-commands enables performance of a respective one of the plurality of constituent functionalities, and execution of the plurality of sub-commands emulates performance of the first functionality on at least the first device. Referring to the example above, a first sub-command (or set of first sub-commands) is generated for the thermostat device 102 for activating or deactivating the cooling/heating functionality, while a second sub-command (or set of second sub-commands) is generated for the hub device 180 to enable the sending of the first sub-command to the thermostat in accordance with a predefined schedule. In doing so, the first functionality for operating a thermostat in accordance with a predefined schedule is enabled for the thermostat, although neither the thermostat nor the hub device itself has such capabilities. Stages of methods 1000-A through 1000-F (FIGS. 10A-10H) and the method 1100 (FIG. 11) may be performed additionally and/or alternatively to one another, and may be performed in accordance with any implementations described with respect to one another. For example, any of the functionalities and constituent functionalities described may be combined with one another, and may be executed by any combination of devices.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for operating a smart home environment, comprising:
    at a first smart home device having one or more processors and memory storing one or more programs for execution by the one or more processors, the one or more programs including instructions for:
        receiving a first command for performing a first functionality on at least a second connected device, the first functionality comprising a plurality of constituent functionalities, wherein the second device is not configured to execute the first command;
        translating the first command into a sequence of sub-commands for execution by respective devices including the first smart home device and the second device, wherein:
            the sequence of sub-commands includes one or more first sub-commands that can be executed on the second device and a second sub-command that can be executed on the first smart home device;

each of the sub-commands, when executed, performs a constituent functionality of the plurality of constituent functionalities; and execution of any one of the sub-commands individually does not perform the entire first functionality; and managing execution of the sequence of sub-commands, including:

causing execution of the one or more first sub-commands on the second device;

executing the second sub-command on the first smart home device; and sending results of the executed second sub-command to the second device, wherein execution of the sequence of sub-commands emulates performance of the first functionality on the second device.

2. The method of claim 1, wherein:

the first functionality is for operating the second device in accordance with a predefined schedule;

the plurality of constituent functionalities comprises:

a first constituent functionality for enabling or disabling an operation of the second device, wherein execution of the one or more first sub-commands by the second device perform the first constituent functionality, and a second constituent functionality for sending commands, including the first sub-command, in accordance with the predefined schedule, wherein execution of the second sub-command by the first smart home device performs the second constituent functionality, the first smart home device being configured with scheduling capabilities; and managing execution of the sequence of sub-commands comprises executing the second sub-command on the first smart home device, including sending the one or more first sub-commands to the second device in accordance with the predefined schedule.

3. The method of claim 2, wherein:

the first functionality is for operating the second device further in accordance with detection of a sunrise or sunset condition in a local area in which the second device is situated;

the plurality of constituent functionalities further comprises a third constituent functionality for detecting the sunrise or sunset conditions, wherein execution of a third one of the sequence of sub-commands performs the third constituent functionality;

the second constituent functionality is for sending the commands, including the one or more first sub-commands, further in accordance with detection of the sunrise or sunset conditions; and executing the second sub-command further includes sending the one or more first sub-commands to the second device upon detection of the sunrise or sunset conditions.

4. The method of claim 2, wherein the second device is a smart plug device that provides power to a coupled device.

5. The method of claim 2, wherein the second device is a thermostat device, and enabling or disabling the operation of the second device includes turning on or off the cooling or heating functionality of the thermostat device.

6. The method of claim 2, wherein the second device is a lock device, and enabling or disabling the operation of the second device includes permitting or denying the locking or unlocking of the lock device.

7. The method of claim 6, wherein the one or more first sub-commands, when executed, cause the lock device to replace an existing list of valid access codes with a new list of valid access codes.

8. The method of claim 2, wherein the predefined schedule is specified with respect to days of the week.

9. The method of claim 2, wherein the predefined schedule is specified with respect to hours for each day of the week.

10. The method of claim 1, wherein:

the second device is a lamp device, and the first functionality is for continuously dimming or brightening the lamp device;

the plurality of constituent functionalities comprises:

a first constituent functionality for setting a dim value of the lamp device, the first constituent functionality corresponding to the one or more first sub-commands to be executed by the lamp device, wherein each of the one or more first sub-commands corresponds to a respective dim value, of a range of dim values for the lamp device, that is set upon execution of a respective first sub-command, and a second constituent functionality for incrementally sending commands, including the one or more first sub-commands, in accordance with a timer, wherein execution of the second sub-command by the first smart home device performs the second constituent functionality; and managing execution of the sequence of sub-commands comprises executing the second sub-command on the first smart home device, including sending the one or more first sub-commands one at a time based on the timer, in order of either decreasing dim value for continuously dimming the lamp device, or increasing dim value for continuously brightening the lamp device.

11. The method of claim 1, wherein:

the second device is a garage door opener coupled to a garage door, and the first functionality is for providing an indication of a percentage by which a garage door operation is complete, wherein a garage door operation for opening the garage door is associated with a first completion time for opening the garage door, and a garage door operation for closing the garage door is associated with a second completion time for closing the garage door;

the plurality of constituent functionalities comprises:

a first constituent functionality for opening or closing the garage door, wherein execution of the one or more first sub-commands by the garage door opener perform the first constituent functionality, a second constituent functionality for identifying an elapsed time since commencing a garage door operation, wherein execution of a third one of the sequence of sub-commands by a timer device performs the second constituent functionality, and a third constituent functionality for determining whether the garage door is fully opened or fully closed, wherein execution of a fourth one of the sequence of sub-commands by a sensor device performs the third constituent functionality; and managing execution of the sequence of sub-commands comprises:

for a garage door operation for opening the garage door, until receiving a determination that the garage door is fully open:

determining the percentage by which the garage door operation is complete by dividing the elapsed time by the first completion time; and providing the indication of the determined percentage; and for a garage door operation for closing the garage door, until receiving a determination that the garage door is fully closed:

determining the percentage by which the garage door operation is complete by dividing the elapsed time by the second completion time; and providing the indication of the determined percentage.

12. The method of claim 1, wherein:

the second device is a thermostat device, and the first functionality is for operating the thermostat device in accordance with temperature readings obtained from a distinct sensor device located remotely from the thermostat device;

the plurality of constituent functionalities comprises:

a first constituent functionality for turning the thermostat device on or off, wherein execution of the one or more first sub-commands by the thermostat device perform the first constituent functionality, and a second constituent functionality for obtaining temperature readings, wherein execution of a third one of the plurality of sub-commands by the sensor device performs the second constituent functionality;

wherein execution of the first sub-command by the thermostat device is in accordance with the temperature readings obtained by the sensor device.

13. The method of claim 1, wherein:

the first functionality is for operating the second device in accordance with an occupancy model developed by presence detection readings obtained from a plurality of sensor devices;

the plurality of constituent functionalities comprises:

a first constituent functionality for enabling or disabling an operation of the second device, wherein execution of the one or more first sub-commands by the second device perform the first constituent functionality, and a second constituent functionality for obtaining presence detection readings, wherein execution of a third one of the sequence of sub-commands by the plurality of sensor devices performs the second constituent functionality;

wherein execution of the one or more first sub-commands by the second device is in accordance with the occupancy model developed by presence detection readings obtained from the plurality of sensor devices.

14. The method of claim 13, wherein the plurality of sensor devices includes IR sensors.

15. The method of claim 1, wherein:

the second device is a sound system for playing audio from multiple sources, and the first functionality is for operating the sound system in response to detecting activation of a push button;

the plurality of constituent functionalities comprises:

a first constituent functionality for playing audio on the sound system, wherein execution of the one or more first sub-commands by the sound system perform the first constituent functionality, and a second constituent functionality for transmitting a trigger signal to one or more remote devices, including the sound system, in response to detecting activation of the push button, wherein execution of a third one of the sequence of sub-commands by the push button performs the second constituent functionality; and wherein execution of the first sub-command by the sound system is in response to the sound system receiving the trigger signal from the push button, the push button transmitting the trigger signal in response to detecting activation of the push button.

16. The method of claim 15, wherein:

the first functionality is for further operating a camera device in response to detecting activation of the push button; and the plurality of constituent functionalities further comprises a third constituent functionality for capturing an image, wherein execution of a fourth one of the sequence of sub-commands by the camera device performs the third constituent functionality, wherein execution of the fourth sub-command by the camera device is in response to the camera device receiving the trigger signal from the push button, the push button transmitting the trigger signal in response to detecting activation of the push button.

17. The method of claim 1, wherein the first smart home device is a hub device communicably coupled to at least the second device.

18. The method of claim 1, wherein the first smart home device is a remote server distinct from the second device.

19. A method for operating a smart home environment, comprising:

at a computer system:

identifying a first functionality to be performed, the first functionality comprising a plurality of constituent functionalities;

obtaining respective sets of functionalities for a plurality of devices including a first smart home device and at least a second device;

identifying two or more devices, of the plurality of devices and including the first smart home device and the second device, having respective sets of functionalities that together include the plurality of constituent functionalities;

generating a sequence of sub-commands including one or more first sub-commands and a second sub-command, wherein:

the one or more first sub-commands are for execution by the second device;

the second sub-command is for execution by the first smart home device;

execution of a respective one of the sequence of sub-commands enables performance of one of the plurality of constituent functionalities; and execution of the sequence of sub-commands emulates performance of the first functionality.

20. A non-transitory computer readable storage medium, storing one or more programs for execution by one or more processors of a first smart home device operating in a smart home environment, the one or more programs including instructions for:

receiving a first command for performing a first functionality on at least a second connected device, the first functionality comprising a plurality of constituent functionalities, wherein the second device is not configured to execute the first command;

translating the first command into a sequence of sub-commands for execution by respective devices including the first smart home device and the second device, wherein:

the plurality of sub-commands includes one or more first sub-commands that can be executed on the second device and a second sub-command that can be executed on the first smart home device;

each of the sub-commands, when executed, performs a constituent functionality of the plurality of constituent; and execution of any one of the sub-commands individually does not perform the entire first functionality; and managing execution of the sequence of sub-commands, including:

causing execution of the one or more first sub-commands on the second device;

executing the second sub-command on the first smart home device; and sending results of the executed second sub-command to the second device, wherein execution of the sequence of sub-commands emulates performance of the first functionality on at least the second device.

* * * * *